US010636158B1

(12) United States Patent
Kamiyama et al.

(10) Patent No.: US 10,636,158 B1
(45) Date of Patent: Apr. 28, 2020

(54) METHODS AND SYSTEMS FOR HEIGHT ESTIMATION FROM A 2D IMAGE USING AUGMENTED REALITY

(71) Applicant: Bodygram, Inc., Las Vegas, NV (US)

(72) Inventors: Kyohei Kamiyama, Tokyo (JP); Chong Jin Koh, Las Vegas, NV (US)

(73) Assignee: Bodygram, Inc., Las Vegas, NV (US)

( * ) Notice: Subject to any disclaimer, the term of this patent is extended or adjusted under 35 U.S.C. 154(b) by 0 days.

(21) Appl. No.: 16/741,620

(22) Filed: Jan. 13, 2020

(51) Int. Cl.
*G06T 19/00* (2011.01)
*G06T 7/60* (2017.01)
*G06K 9/00* (2006.01)
*G06T 7/50* (2017.01)
*G06F 8/77* (2018.01)

(52) U.S. Cl.
CPC ............ *G06T 7/60* (2013.01); *G06K 9/00228* (2013.01); *G06T 7/50* (2017.01); *G06T 19/006* (2013.01); *G06F 8/77* (2013.01); *G06T 2207/30201* (2013.01)

(58) Field of Classification Search
None
See application file for complete search history.

(56) References Cited

U.S. PATENT DOCUMENTS 9,026,392 B2 * 5/2015 Staats .................. A61B 5/1072
702/97
2018/0045504 A1 * 2/2018 Jiang ...................... G01B 11/02
2018/0341818 A1 * 11/2018 Steffanson ....... G08B 13/19602

FOREIGN PATENT DOCUMENTS

KR    20160141688 A    12/2016
KR    20160142797 A    12/2016

OTHER PUBLICATIONS

AirMeasure Application website, last accessed on Jan. 13, 2020.
P. Contreras, B. Guamán, M. Saca, F. Sumba, and M. Falconi, "Measurement of height throught software developed for mobile devices for the growth control in children," 2014 IEEE ANDESCON, Cochabamba, 2014.

* cited by examiner

*Primary Examiner* — Yanna Wu
(74) *Attorney, Agent, or Firm* — American Patent Agency PC; Daniar Hussain

(57) ABSTRACT

A mobile computing device used for measuring the height of an object, such as a human user, may be positioned on a reference surface, such as the ground plane. The reference surface is detected and a position guide is generated in an augmented reality (AR) plane on a display of the mobile computing device. The AR plane enables the object being measured to be positioned at a measurement position located at a predefined distance along the reference surface from the mobile computing device. The top and bottom of the object are detected in an image taken by the mobile computing device. The height of the object is measured based on the predefined distance and a distance between the top and bottom of the object in the image. The height of the object can also be measured with assistance from software development kits (SDKs) included in the mobile computing device.

20 Claims, 14 Drawing Sheets

METHODS AND SYSTEMS FOR HEIGHT ESTIMATION FROM A 2D IMAGE USING AUGMENTED REALITY

REFERENCE TO RELATED APPLICATIONS

This application is related to U.S. Pat. No. 10,321,728, issued on 18 Jun. 2019, filed as U.S. Ser. No. 16/195,802, filed on 19 Nov. 2018, and entitled "SYSTEMS AND METHODS FOR FULL BODY MEASUREMENTS EXTRACTION," which claims priority from U.S. Ser. No. 62/660,377, filed on 20 Apr. 2018, and entitled "SYSTEMS AND METHODS FOR FULL BODY MEASUREMENTS EXTRACTION USING A 2D PHONE CAMERA." The entire disclosures of all referenced applications are hereby incorporated by reference in their entireties herein.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the U.S. Patent and Trademark Office files or records, but otherwise reserves all copyright and trade dress rights whatsoever.

FIELD OF THE INVENTION

Embodiments of the present invention are in the field of automated 3D object measurements. Embodiments pertain particularly to accurately estimating the height of a 3D object using Augmented Reality (AR) techniques.

BACKGROUND OF THE INVENTION

The statements in the background of the invention are provided to assist with understanding the invention and its applications and uses, and may not constitute prior art.

There are many applications where measuring the height of an object, such as a human being, using just a camera device on a mobile computing device would be highly desirable. For example, one illustrative application includes accurately tracking a child's growth, using just photographs taken of the child taken with an ordinary smartphone. Another illustrative application includes measuring the height of a piece of furniture, such as a table, using just a photograph taken of the table with a mobile device while shopping.

Another application is in the field of e-commerce for online retailers desiring accurate body measurements, including the height of the shopper. One instance where 3D measurements from images are vital includes identifying clothing sizes for shoppers. There have been several approaches that have been tried to extract 3D measurements from images of 3D objects, including utilizing specialized 3D cameras as well as utilizing 2D videos or 2D photos, followed by 2D-to-3D reconstruction techniques to estimate 3D measurements.

One new technique for 3D measurements, described in U.S. Pat. No. 10,321,728 referenced above, is to utilize deep learning networks to extract measurements from 2D photos taken using a single mobile device camera. This technique minimizes user frictions while promising to deliver highly accurate measurements. 2D photos can be very useful in situations where the 3D object is not physically present to provide measurements. However, in order to obtain accurate measurements, some size reference is needed. For example, in the case of body measurements, the user is required to provide their own height in order to normalize the rest of the body measurements from pixel dimensions to real-world dimensions. However, many users don't have an accurate knowledge of their own height. Similarly, when obtaining measurements of other objects, physical scale guides or reference objects with standardized sizes, such as credit cards or A4 pieces of paper, need to be used in order to obtain accurate measurements. However, using physical scale guides or reference objects for obtaining measurements of 3D objects introduces unnecessary user frictions into the measurement process since a reference object with a known size has to be readily available.

Therefore, it would be an advancement in the state of the art to provide a method by which the height of an object, such as a user, may be accurately measured in real-world coordinates from just a single photograph taken of the object using an ordinary mobile device camera.

It is against this background that the present invention was developed.

BRIEF SUMMARY OF THE INVENTION

The present invention relates to methods and systems for obtaining heights of 3D objects, including human users, using cameras within mobile computing devices, such as smartphones or tablet devices, without the need for scale guides or reference objects. In an example, a user who may be measuring the height of a 3D object (which can include the user), can be initially instructed to place the mobile computing device with the camera at a predefined height from a reference surface such as the ground—preferably perpendicular to the reference surface. In an example, the predefined height is zero centimeters, i.e., the mobile computing device is placed on the reference surface. A position guide or a marker that aids in positioning the 3D object is generated at a predefined distance from the mobile computing device, in a manner that enables the height measurement by the mobile computing device. In an example, the position guide is generated in an Augmented Reality (AR) plane based on the angle and focal length of the camera. The height of the 3D object can be determined based on the predefined distance of the 3D object from the mobile computing device and the pixel height of an image of the 3D object within the position guide using techniques as detailed herein.

In another example, the predefined height from the reference surface, for example, the ground can be about 60-80 centimeters (preferably about 70 centimeters), corresponding to the height of a desk. The mobile device is placed, for example, at a predefined angle of about 80-90 degrees (preferably about 90 degrees). Again, a position guide or a marker is generated so that the user's image can be positioned within the marker. In one example, the angle of the mobile computing device can be determined from the accelerometer data. With the 3D object at a known distance and the pixel height of an image of the 3D object within the position guide being measured in terms of pixel count, the real height of the 3D object can be proportionately determined based on geometric principles, such as the similarity of the triangles.

In another example, an augmented reality software development kit (AR-SDK) can be employed along with a computer vision software development kit (CV-SDK) to obtain the height of the 3D object, such as a human user. The ground plane is initially detected using the AR-SDK included in the operating systems that run on the mobile computing devices, such as smartphones. The user operating the smartphone can be instructed to stand at a predefined distance from the smartphone. When the user is stably positioned at the predefined distance, one or more body features of the user, such as the eyes of the user, can be detected using the CV-SDK, or by using deep learning networks (DLNs). The mid-point or the center between the eyes can be calculated using relative positions of the eyes. A first distance between the center of the eyes and the feet of the user (as obtained from the ground plane measurement) can be obtained using techniques such as triangulation. Similarly, a second distance from the mid-point between the eyes to the top of the head (i.e., the height of the top of the user's head) can be obtained by using techniques such as deep learning networks (DLNs) trained on human head images. The first and second distances can be summed to obtain the user's height. Similarly, multiple intermediate distances can be measured by identifying different body features along the length of the user's body and the total height of the user from the top of the user's head to the tip of the user's toes can be obtained as a sum of the multiple intermediate distances.

Accordingly, one embodiment of the present invention is a computer-implemented method for measuring a height of a 3D object that is executable by a hardware processor. The method comprises determining positioning of a mobile computing device for height measurement of the 3D object; detecting a reference surface on which the 3D object is to be positioned for height measurement; generating a position guide in an augmented reality (AR) plane along the reference surface on a display of the mobile computing device for positioning the 3D object on the position guide; receiving an image of the 3D object located at the position guide from a camera device on the mobile computing device; and measuring the height of the 3D object from the image of the 3D object located at the position guide.

In one embodiment, the measuring the height of the 3D object further comprises determining a pixel height of the 3D object in the image of the 3D object positioned at a predefined distance on the position guide; and measuring the height in real-world coordinates of the 3D object based on the predefined distance and the pixel height.

In one embodiment, the generating the position guide in the augmented reality (AR) plane further comprises obtaining a focal length of a camera device of the mobile device from a camera intrinsic matrix; and generating the position guide based on at least the focal length and a height of the mobile computing device from the reference surface.

In one embodiment, the method further comprises calculating dimensions of the position guide based on a focal length of the camera device and/or an orientation of the mobile computing device.

In one embodiment, the 3D object is a user, and the method further comprises providing instructions that the user's feet be positioned on the position guide.

In one embodiment, the method further comprises providing instructions for positioning the mobile computing device at a predefined height from the reference surface and at a predefined angle to the reference surface; and providing instructions for positioning the 3D object on the position guide at a predefined distance from the mobile computing device.

In one embodiment, the predefined height of the mobile computing device is zero centimeters from the reference surface and the mobile computing device is placed on the reference surface.

In one embodiment, the predefined height is between 50 centimeters and 100 centimeters from the reference surface.

In one embodiment, the predefined angle is between 75 degrees and 90 degrees to the reference surface.

In one embodiment, the method further comprises determining a pixel vertical height of the 3D object in the image positioned at the predefined distance on the position guide; determining a pixel horizontal distance between a position of the 3D object at the predefined distance and a projected point of intersection of two rays, wherein a first ray originates from a bottom of the 3D object and terminates at the bottom of the 3D object in the image, and wherein a second ray originates from a top of the 3D object and terminates at the top of 3D object in the image; and measuring the height of the 3D object based on the pixel vertical height of the image of the 3D object, the predefined distance of the 3D object from the mobile computing device, and the pixel horizontal distance.

In one embodiment, the detecting the reference surface on which the 3D object is to be positioned further comprises detecting the reference surface on which the 3D object is positioned by employing an Augmented Reality Software Development Kit (AR-SDK) on the mobile computing device to generate the position guide.

In one embodiment, the method further comprises determining a pixel height of the 3D object utilizing the reference surface on which the 3D object is positioned by employing the Augmented Reality Software Development Kit (AR-SDK).

In one embodiment, the determining the pixel height of the 3D object further comprises detecting a top of the 3D object using an object detection model within a Computer Vision Software Development Kit (CV-SDK) on the mobile computing device; and measuring a distance between the reference surface and the top of the 3D object as the height of the 3D object.

In one embodiment, the 3D object is a user, and wherein the measuring the height of the user further comprises detecting one or more facial features of the user; determining a first distance between the reference surface and the one or more facial features; determining a second distance between the one or more facial features and a top of the user's head; and computing a sum of the first distance and the second distance to measure the height of the user.

In one embodiment, the detecting the one or more facial features of the user further comprises employing an object detection model from a Computer Vision Software Development Kit (CV-SDK) on the mobile device for detecting the one or more facial features.

In one embodiment, the method further comprises providing one or more audible or visual instructions if the 3D object is not accurately positioned on the position guide.

In one embodiment, the method further comprises detecting the reference surface on which the 3D object is positioned; detecting one or more portions along a length of the 3D object using one or more object detection models; and determining the height of the 3D object as a sum of a first distance between the reference surface and the one or more portions of the 3D object and a second distance between the one or more portions and a top of the 3D object.

In one embodiment, the method further comprises determining the second distance between the one or more elements of the 3D object and the top of the 3D object as a sum of intermediate distances between different elements measured along the 3D object.

Another embodiment is a mobile computing device for measuring a height of a 3D object. The mobile computing device comprises a camera device, a display, a processor, and a non-transitory memory storing program code thereon. The program code is executable by the processor to determine positioning of a mobile computing device for height measurement of the 3D object; detect a reference surface on which the 3D object is to be positioned for height measurement; generate a position guide in an augmented reality (AR) plane along the reference surface on a display of the mobile computing device for positioning the 3D object on the position guide; receive an image of the 3D object located at the position guide from a camera device on the mobile computing device; and measure the height of the 3D object from the image of the 3D object located at the position guide.

Yet another embodiment is a non-transitory storage medium for measuring a height of a 3D object. The storage medium comprises machine-readable program code that cause a processor to determine positioning of a mobile computing device for height measurement of the 3D object; detect a reference surface on which the 3D object is to be positioned for height measurement; generate a position guide in an augmented reality (AR) plane along the reference surface on a display of the mobile computing device for positioning the 3D object on the position guide; receive an image of the 3D object located at the position guide from a camera device on the mobile computing device; and measure the height of the 3D object from the image of the 3D object located at the position guide.

In various embodiments, a computer program product is disclosed. The computer program may be used to enable a mobile device to automatically measure the height of a 3D object and may include a computer-readable storage medium having program instructions, or program code, embodied therewith, the program instructions executable by a processor to cause the processor to perform the steps described herein.

In various embodiments, a system is described, including a memory that stores computer-executable components; a hardware processor, operably coupled to the memory, and that executes the computer-executable components stored in the memory, wherein the computer-executable components may include components communicatively coupled with the processor that execute the steps described herein.

In another embodiment, the present invention is a non-transitory, computer-readable storage medium storing executable instructions or program code, which when executed by a processor, causes the processor to perform a process for automatic height measurement, the instructions causing the processor to perform the steps described herein.

In another embodiment, the present invention is a system for automatic height measurement using a 2D phone camera, the system comprising a user device or a mobile computing device having a 2D camera, a processor, a display, a first memory; a server comprising a second memory and a data repository; a telecommunications-link between said user device and said server; and a plurality of computer codes embodied on said first and second memory of said user-device and said server, said plurality of computer codes when executed causes said server and said user-device to execute a process comprising the steps described herein.

In yet another embodiment, the present invention is a computerized server comprising at least one processor, memory, and a plurality of computer codes embodied on said memory, said plurality of computer codes when executed causes said processor to execute a process comprising the steps described herein. Other aspects and embodiments of the present invention include the methods, processes, and algorithms comprising the steps described herein, and also include the processes and modes of operation of the systems and servers described herein.

Yet other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which.

DETAILED DESCRIPTION OF THE INVENTION

With reference to the figures provided, embodiments of the present invention are now described in detail.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Measuring the Height of an Object Using Augmented Reality (AR)

Many different types of approaches were employed to measure 1D measurements of 3D objects. All these approaches generally require the user, or an object, to comply with conditions including particular poses or a particular type of clothing, in controlled environments, thereby causing significant user friction. Some measurement tools require users to enter certain parameters manually prior to the measurement process in order to obtain other measurements accurately. For example, in order to obtain accurate body measurements, some measurement tools require the user to enter their own height before the other body measurements can be calculated. However, many users may not know their own height or may be discouraged from proceeding further with the body measurement tool because of their uncertainty about their own height. There are also many other applications where measuring the height of an object, such as a human being, using just a camera device on a mobile computing device would be highly desirable.

The present invention solves the aforementioned problems by providing a system and method for accurately measuring the height of a 3D object, particularly, a human being, using various software and hardware components included in mobile computing devices. More particularly, the height measurement procedures disclosed herein employ software procedures and intrinsic hardware attributes of the mobile computing devices to derive the height of the 3D object. In addition, the software installed on the operating systems of the mobile computing device may be employed in some embodiments to improve the accuracy of the height measurement procedure, while minimizing user frictions.

Figure 1A:
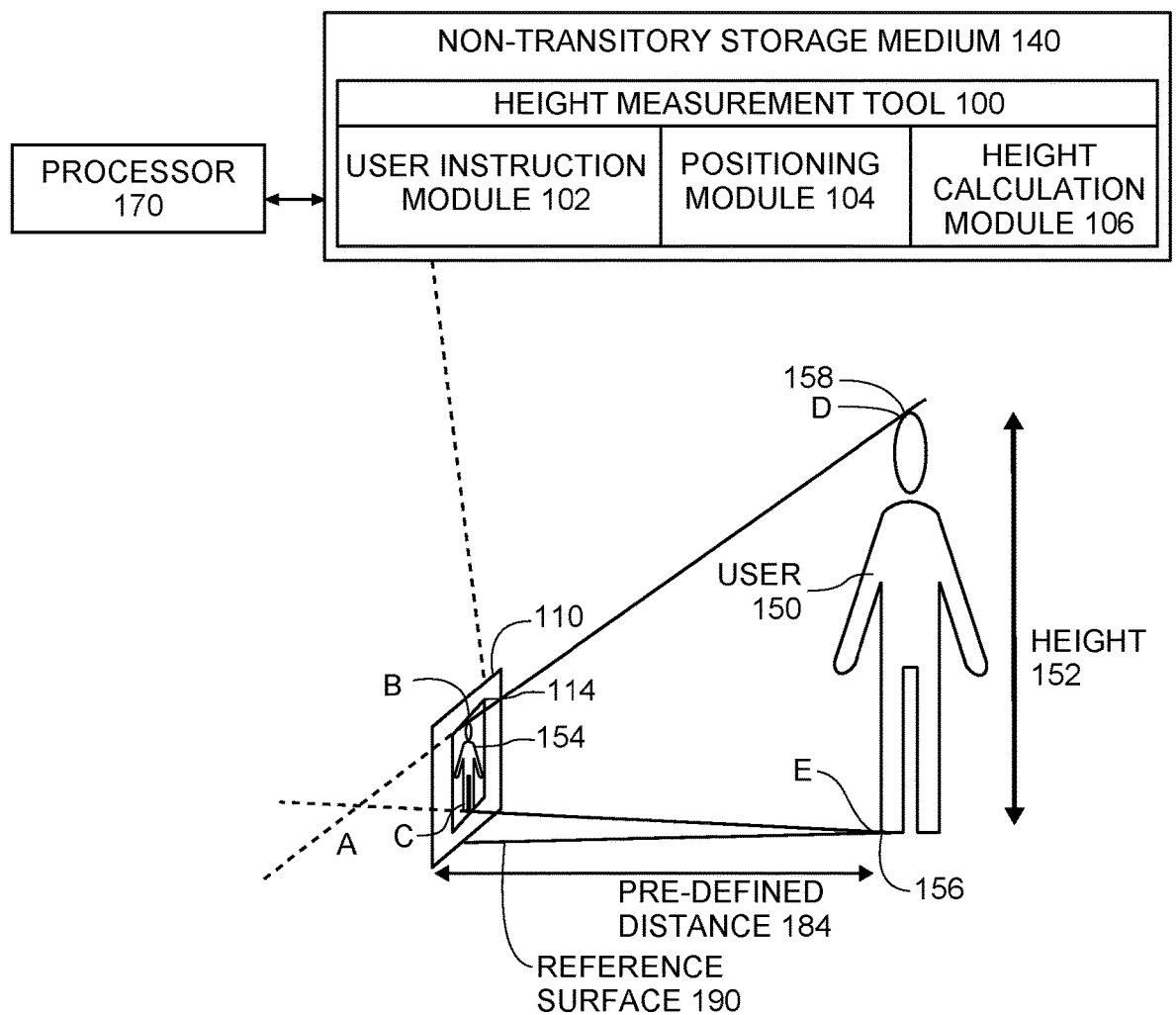
FIG. 1A shows a diagram of a height measurement tool configured to automatically determine the height of a 3D object, such as a user, when a mobile device is placed on the ground, in accordance with one embodiment of the invention.

FIG. 1A shows a diagram of a height measurement tool 100 configured to automatically determine the height of a 3D object, such as a user 150, positioned in front of a mobile computing device 110. The height measurement tool 100 can be implemented as modules stored on a non-transitory, processor-readable storage medium 140 comprising machine-readable instructions executable by one or more processors 170 of a mobile computing device 110. In one embodiment, the height measurement tool 100 includes a user instruction module 102, a positioning module 104, and a height calculation module 106. The user instruction module 102 provides instructions regarding the positioning of the mobile computing device 110 and the user 150. The user instruction module 102 generates initial device positioning instructions regarding the height (e.g., a predefined height) at which the mobile computing device 110 is to be placed with respect to a reference surface 190 such as the ground and the angle (e.g., a predefined angle) at which that the mobile computing device 110 is to be positioned with respect to the reference surface 190. The positioning module 104 can be configured to generate a position guide 114 within an Augmented Reality (AR) plane that enables positioning the user 150 at a predefined distance from the mobile computing device 110 in a manner that enables the height measurement tool 100 to obtain an accurate measurement of the user's height 152. The user instruction module 102 and the positioning module 104 can operate synchronously to sense the various attributes and instruct the user as necessary regarding positioning aspects to obtain accurate height assessments. When the mobile computing device 110 is positioned as required with respect to the reference surface 190 (i.e., at the predefined height from the reference surface 190 and at the predefined angle to the reference surface 190) and the user 150 is positioned within the position guide 114 at the predefined distance from the mobile computing device 110 as instructed, the height calculation module 106 can determine the user's height 152.

In an example, the predefined height of the mobile computing device 110 from the reference surface 190 can be zero centimeters; in other words, the mobile computing device 110 can be placed on the reference surface 190. As seen in FIG. 1A, the mobile computing device 110 is positioned on the reference surface 190, e.g., the ground, preferably at 80-90 degrees to the ground. The positioning hardware onboard the mobile computing device 110, such as the accelerometer, the gyroscope, etc., detect when the mobile computing device 110 is positioned as instructed. In an example, another object (not shown) or another user (not shown) can be employed to position the mobile computing device 110 at the predefined height and at the predefined angle to the ground. Furthermore, the user instruction module 102 may also provide instruction and feedback regarding an orientation of the mobile computing device 110 when executing the height measurement procedure.

In an example, the user instruction module 102 can provide the instructions visually via displaying text messages on the screen of the mobile computing device 110 or by non-textual graphics which can be comprehended by the users easily, for example, via changing colors or other attributes of the user interface elements. The user instruction module 102 can optionally or additionally provide audible positioning instructions by making use of voice communication Application Programming Interfaces (APIs) provided by the operating systems of the various mobile computing devices.

The signals from the positioning hardware are received by the positioning module 104, which then generates a position guide 114 on a display of the mobile computing device 110 upon sensing that the mobile computing device 110 is correctly positioned with respect to the reference surface 190. The position guide 114 guides the user 150 to be positioned correctly for obtaining the user's height measurements. The attributes of the position guide 114 are obtained based on the properties of the hardware onboard the mobile computing device 110 and other external factors such as the predefined angle, etc. Various hardware attributes, such as but not limited to, the size of the screen on the mobile computing device 110 and the focal length of the camera included in the mobile computing device 110, can affect the size attributes, such as the height and the width of the position guide 114, as will be recognized by one of ordinary skill in the art.

The screen size of a mobile computing device 110 is the visible space provided to the various apps that are executed by the mobile computing device 110. It may be noted that the screen size as used by the apps need not be the actual size of the device screen. Various factors such as the device orientation (whether in portrait or landscape position), system decorations such as toolbars and permitted window configuration changes (e.g., resizing windows, multi-window mode settings), etc., can affect the size of the position guide 114. In an example, the position guide 114 can be generated to extend throughout the visible space of the screen of the mobile computing device 110. In an example, the position guide 114 can be generated so that the height and the width attributes of the position guide 114 are smaller than the visible space on the screen available to the height measurement tool 100. The Application Programming Interfaces (APIs) provided by the operating systems of the various mobile computing devices can be used to programmatically resize the position guide 114 to suit different device sizes and device orientations. In an example, the device positioning instructions can include suggestions to orient the device in a particular position, such as in a portrait or landscape orientation to better determine the user's height in a given scenario.

The focal length of the camera onboard the mobile computing device 110 may be another factor affecting the size of the position guide 114. Generally, a camera intrinsic matrix, provided by the mobile device, may be used to denote a projective mapping from real-world coordinates to pixel coordinates. The intrinsic matrix of a camera includes a plurality of parameters pertaining to the focal length, image sensor format, and the principal point. The position guide 114 is then generated based on the focal length of the camera and the orientation or angle of the camera. The focal length of the camera on the mobile computing device 110 may be obtained, for example, from the camera intrinsic matrix, and the orientation or angle of the mobile computing device 110 may be obtained, for example, from positioning hardware on the mobile device (such as the accelerometer, gyroscope, etc.).

The position guide 114 is generated per the size attributes as described above and displayed on the screen of the mobile computing device 110. The positioning module 104 may then signal the user instruction module 102 to instruct the user 150 regarding the position to be assumed by the user 150 in order to measure the user's height 152. In an example, the user 150 may be instructed to stand at a predefined distance 184 to the mobile computing device 110. Again, a range may be preconfigured within the height measurement tool 100 for the predefined distance based on the focal lengths of the cameras that may be mounted on different mobile computing devices that may be employed for height measurements as disclosed herein. The user 150 may be instructed to stand at the predefined distance 184 to the mobile computing device 110. When the user 150 is positioned approximately at the predefined distance 184, the user 150 may signal visibly or audibly, that the user 150 is ready for height measurement. Again, the user instruction module 102 may instruct the user 150 regarding the signal indicative of the user's readiness for height measurement. When the user 150 assumes a height measurement position at the predefined distance 152, an image 154 of the user 150 is generated on the screen of the mobile computing device 110. On detecting the image 154 within the position guide 114, the positioning module 104 may further determine if the top 158 of the user's 150 head and the tip 156 of the user's 150 toes as captured in the image 154 are positioned accurately within the position guide 114. Accurate positioning of the user 150 for height measurement may be indicated by the top of the head in the image 154 just touching and without going over the upper edge of the position guide 114. Similarly, the tip of the toes in the image 154 need to be just touching and without going under the bottom edge of the position guide 114. If the user 150 is not positioned correctly, the positioning module 104 may output instructions to correct the user's 150 positions within the position guide 114. For example, the user 150 may be instructed by the user instruction module 102 to move further back if the top 158 or the tip 156 in the image 154 overshoots the upper or lower edges of the position guide 114. Similarly, a difference threshold may be coded into the position module 104 so that if the gap between the top 158 or the tip 156 in the image 154 and the corresponding upper or lower edges of the position guide 114 is higher than the difference threshold, the user 150 may be instructed to move up closer to the mobile computing device 110 so that the gap is reduced and falls within the difference threshold. On determining that the user 150 is accurately positioned for height measurement, the positioning module 104 may trigger the height calculation module 106 to begin the height measurement procedure.

Figure 1B:
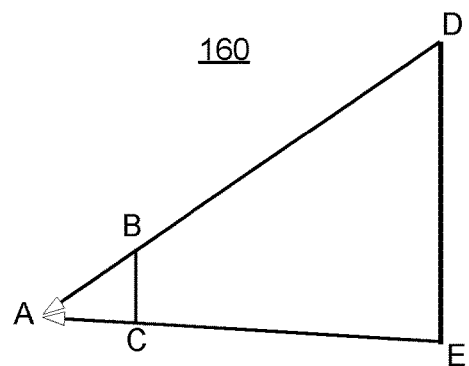
FIG. 1B shows a similarity triangle to determine the height of a 3D object when the mobile device is placed on the ground, in accordance with one embodiment of the invention.

When the user 150 is correctly positioned for height measurement, it can be seen from FIG. 1A, that the user 150 and the image 154 form two similar triangles, Δ ABC and Δ ADE, as shown in diagram 160 of FIG. 1B. The similar triangles, Δ ABC and Δ ADE, are formed from two rays AD and AE that intersect at a point 'A' when projected into the AR plane. In an example, the height calculation module 106 can employ object detection models that are trained to identify the necessary portions of the user's 150 body including, the top 158 and the bottom 156 of the user in the image 154. The user's height 152 (DE) as measured from the bottom 156 of the user's toes to the top 158 of the user's head can be obtained by the height calculation module 106 based on the distance 184 of the user 150 from the mobile computing device 110 and an angle that the top of the user's 150 head makes with the mobile computing device 110. As seen from the diagram 160, a first ray BD that originates at the top of the user's head 158 (D) and touches the top of the head of the image (B) and a second ray CE that starts at the bottom of the user's toes 156 (E) and touches the bottom of the toes in the image (C) can be projected back into the mobile computing device 110 to determine their projected point of intersection A in the virtual space. As seen from the diagram 160, triangle ABC is similar to triangle ADE. As the values of the line segments, AC, CE (the predefined distance), and BC (i.e., the height of the image 154 within the position guide 114 in terms of pixel count) are known, the real height 152 of the user 150, which is proportional to BC, can be measured.

Figure 1C:
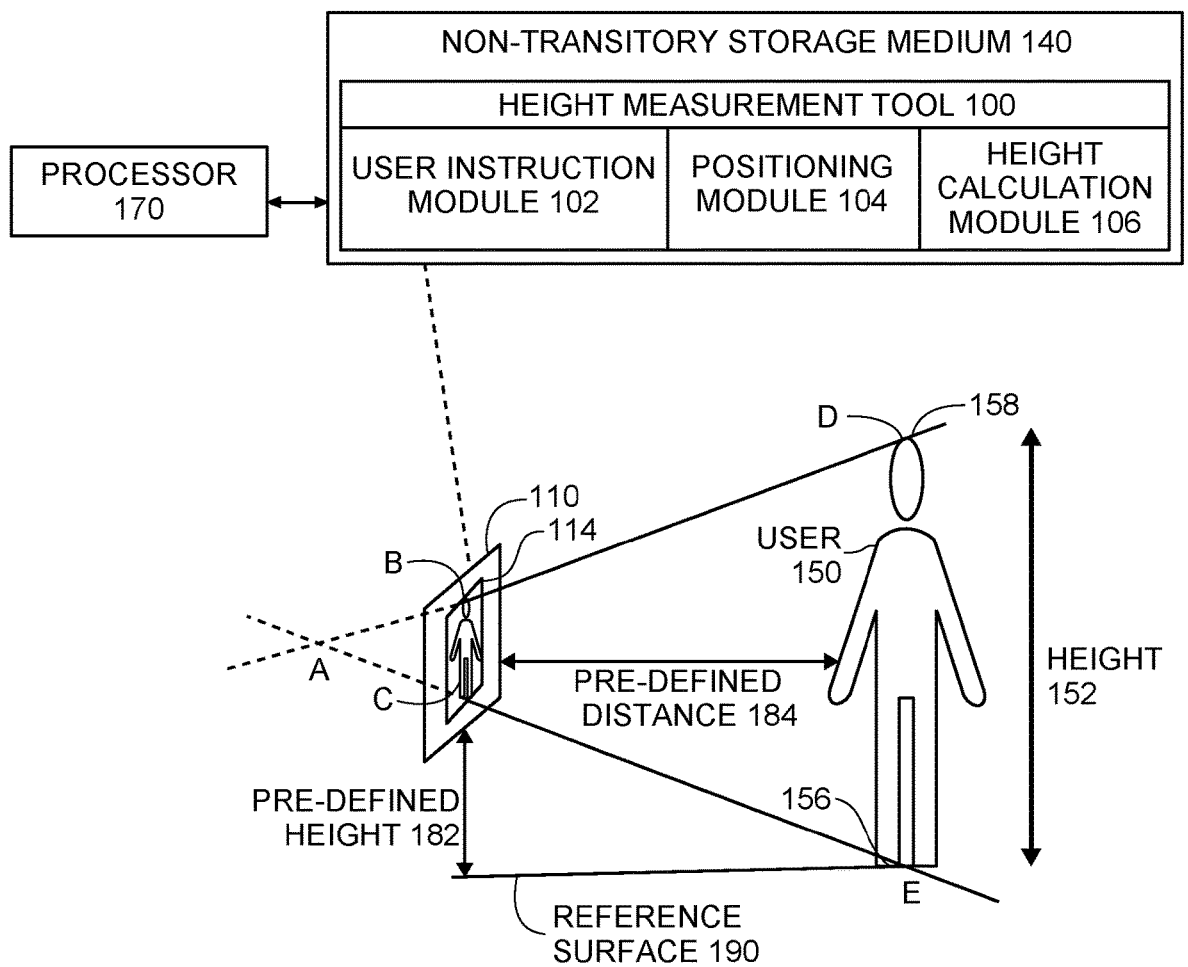
FIG. 1C shows a diagram of the height measurement tool configured to automatically determine the height of a 3D object, such as a user, when the mobile device is placed above the ground, for example on a table, in accordance with another embodiment of the invention.

FIG. 1C shows another scenario where the mobile computing device 110 is held at a predefined height 182 from the reference surface 190, for example, about 60-80 centimeters from the ground 190, with the user 150 at a predefined distance 184 from the mobile computing device 110. In an example, the mobile computing device 110 can be placed on a table against a supporting object, where the table has the predefined height 182. In an example, the mobile computing device 110 can be held by another user perpendicular and at the predefined height 182 to the reference surface 190. In an example, the mobile computing device 110 can be fixed to a stand, a tripod, or the like, and approximately perpendicular to the ground and at the predefined height 182 from the ground. Again, the user instruction module 102 can provide feedback regarding the angle and the height at which the mobile computing device 110 is to be held via sensing the mobile computing device's 110 positioning via the accelerometer, gyroscope, and/or other positioning hardware included in the mobile computing device 110. Similarly, the positioning module 104 determines the attributes of the position guide 114 and generates the position guide 114. The user instruction module 102 then assists the user 150 with standing at a predefined distance from the mobile computing device 110 so that the image 154 of the user 150 is positioned accurately within the position guide 114.

Figure 1D:
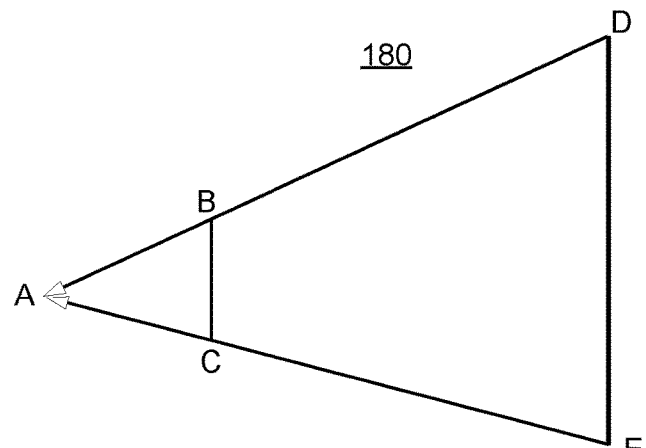
FIG. 1D shows a similarity triangle to determine the height of a 3D object when the mobile device is placed above the ground, in accordance with another embodiment of the invention.

Similar geometric techniques as discussed above can now be applied in order to determine the user's real height 152 (DE), which is measured from the bottom (E) of the user's toes 156 to the top (D) of the user's head 158, as shown in the diagram 180 of FIG. 1D. The ray BD, connecting the top of the user's head 158 (D) with the top of the head of the image (B), and the ray CE, connecting the bottom of the user's toes 156 (E) with the bottom of the toes in the image (C), can be projected back into the mobile computing device 110 to determine their point of intersection A. As seen from the diagram 180, again Δ ABC is similar to Δ ADE. The lengths of the line segments AC and AB (i.e., the projections of the rays DB and EC into the AR plane that intersect at the point A) and BC, which is the pixel height of the user's image within the position guide 114, can be measured in terms of pixel counts. The real height 152 of the user 150, i.e., DE which is proportional to BC can be measured accordingly.

In an example, if the mobile computing device 110 is not perpendicular to the corresponding horizontal surface (either on the ground or at the predefined height), then trigonometric transformations can be applied in order to estimate the real height 152 of the user 150, as will be recognized by one of ordinary skill in the art.

The procedure implemented by the height measurement tool 100 depends on accurately separating the user in the image from the background. Hence, the image pixel height, i.e., BC, can be measured by segmenting the user from the background using methods and systems described elsewhere. In one embodiment, object detection models running on the mobile computing device may be utilized. In another embodiment, body segmentation from the background may be performed as described in U.S. Pat. No. 10,321,728, referenced above, the entire disclosure of which is incorporated herein by reference.

Figure 1E:
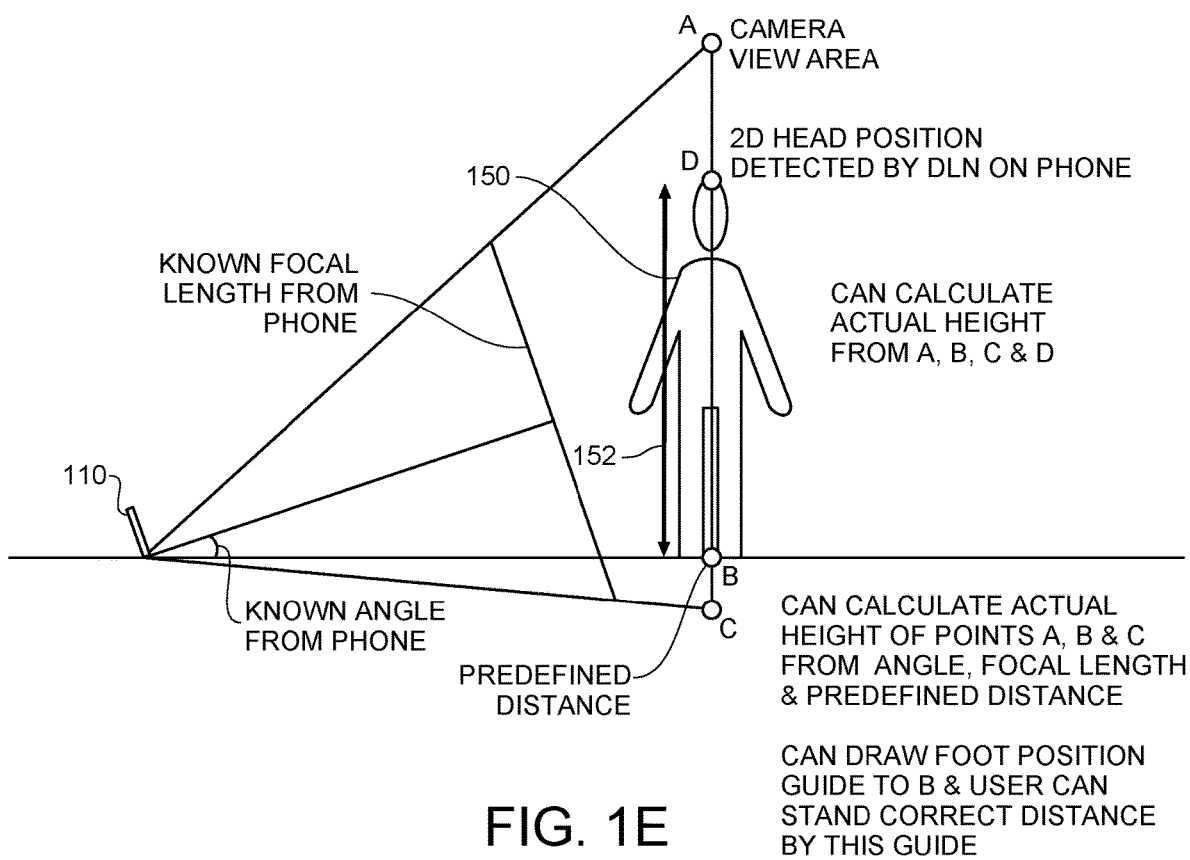
FIG. 1E shows another example of height calculation in accordance with another embodiment of the invention.
Figure 1F:
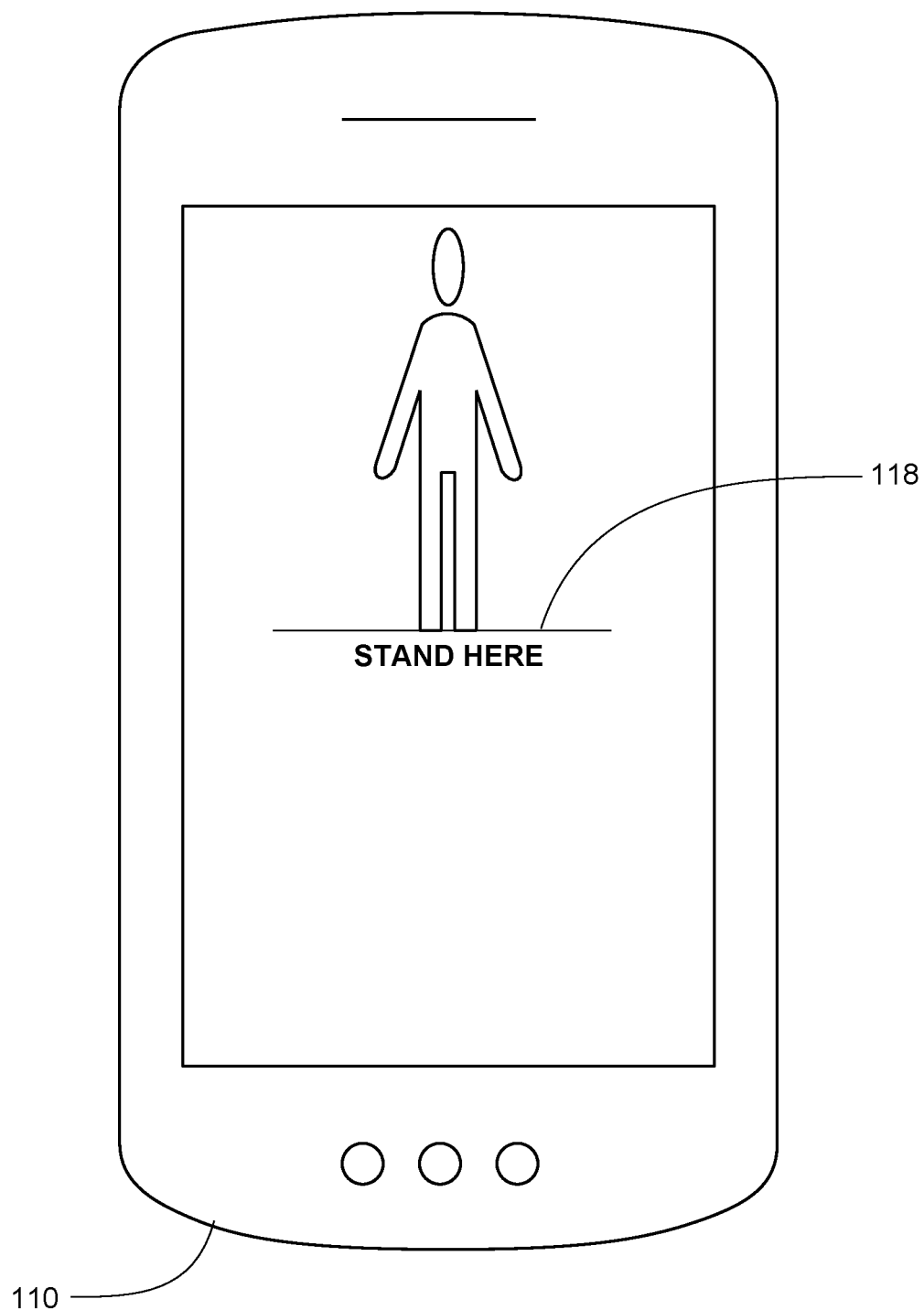
FIG. 1F shows an Augmented Reality (AR) screen showing a foot position guide which guides a user on where to stand with respect to the mobile computing device for height measurement.

FIG. 1E shows another example procedure for calculating the height of the user 150. In the example shown in FIG. 1E, a foot position guide is generated and shown on the 2D display of the mobile computing device 110. An illustrative foot position guide is shown in FIG. 1F. The foot position guide (not shown in FIG. 1E) may be generated based on an angle that the mobile computing device 110 makes with the reference surface 190 and the known focal length of the camera of the mobile computing device 110. The user 150 can be instructed to stand at a predefined distance so that the user's feet coincide with the foot position guide on the 2D screen of the mobile computing device 110. In one embodiment, the position D of the user's head may be detected by a deep learning network (DLN) trained explicitly to identify the user's head. In another embodiment, the user's head may be detected by other object detection algorithms included in the height measurement tool 100 being executed by the mobile computing device 110. Knowing the maximum height of the camera view plane extending from A to C and knowing the value of B as the foot position guide and D as the detected position of the user's head within the camera view plane, the user's height BD can be obtained using known mathematical operations.

FIG. 1F shows an illustration of the mobile computing device 110 with another example of the foot position guide 118 that is used to guide the user to stand at a measuring position from the mobile computing device 110. An instruction to "stand here" can be provided to the user by the user instruction module 102.

The height measurements discussed above employ geometric properties of the various physical and virtual entities involved in the procedures to obtain the user's height 152. However, in some embodiments described herein, the operating systems used on many mobile computing devices include software development kits (SDKs) that may partially mitigate the need to employ geometric calculations and simplify the procedures used to obtain the user's height.

Figure 1G:
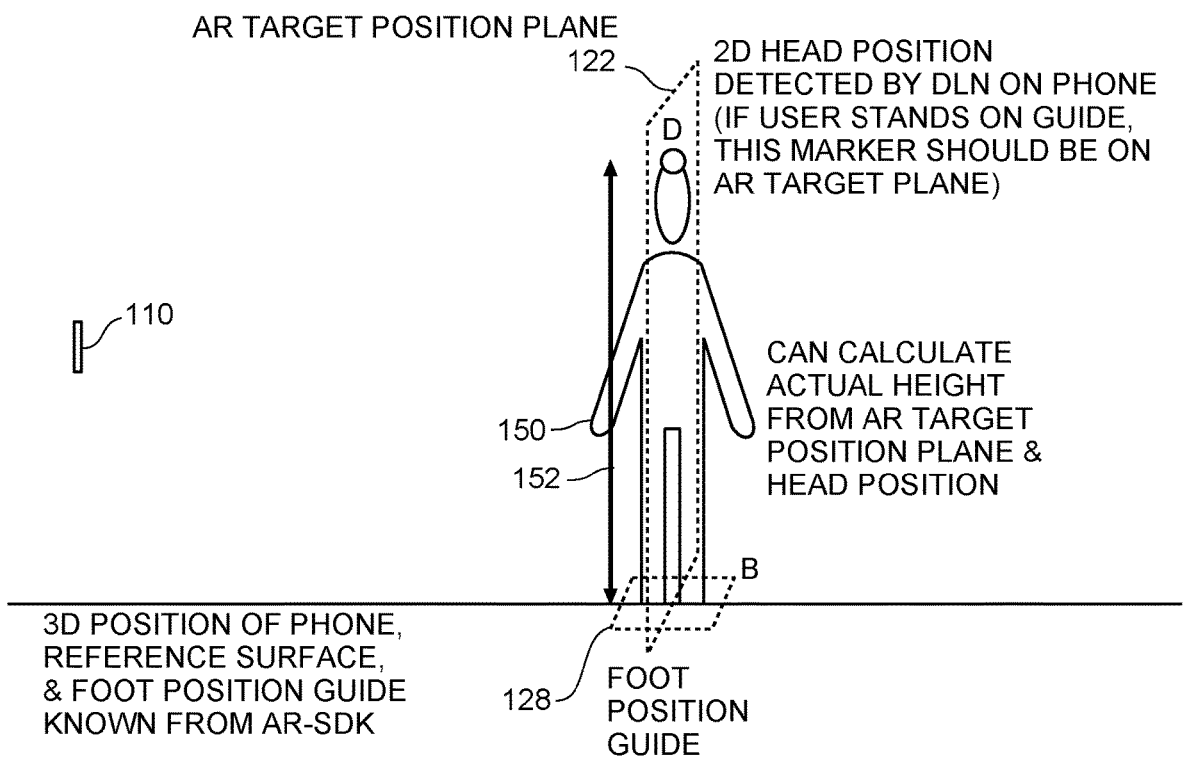
FIG. 1G shows another embodiment of height measurement using an Augmented Reality Software Development Kit (AR-SDK) running on a mobile computing device.

FIG. 1G shows an example procedure for measuring the user's height using the AR-SDKs included within the operating systems of mobile computing devices, such as the mobile computing device 110. Using an AR-SDK can simplify the process of obtaining the height of a 3D object. The foot position guide 128 in this case is generated in an Augmented Reality (AR) target position plane 122 at a predefined distance. For example, the foot position guide 128 can be projected by the mobile computing device 110 on the reference surface 190 or the ground plane. The user 150 can be instructed by the user instruction module 102 to stand at the predefined distance so that the user's feet coincide with the foot position guide 128 at position B. In one embodiment, the user's head position D can again be detected using an explicitly trained DLN, which can be part of the height measurement tool 100. In another embodiment, the user's head position D may be detected using object detection tools, which may be part of the CV-SDK of the operating system being executed by the mobile computing device 110. The user's height BD may be obtained from the head position D and the foot position B in the AR target plane 122. By employing the AR-SDK to assist with measuring the height, the requirement for a predefined distance can be eliminated and the relative positions of the mobile computing device 110 and the user 150 may be determined during the measurement procedure. It will be appreciated that the AR target plane 122 is shown for illustration purposes only, and that the AR target plane may not actually be displayed during the measurement procedure.

Figure 2:
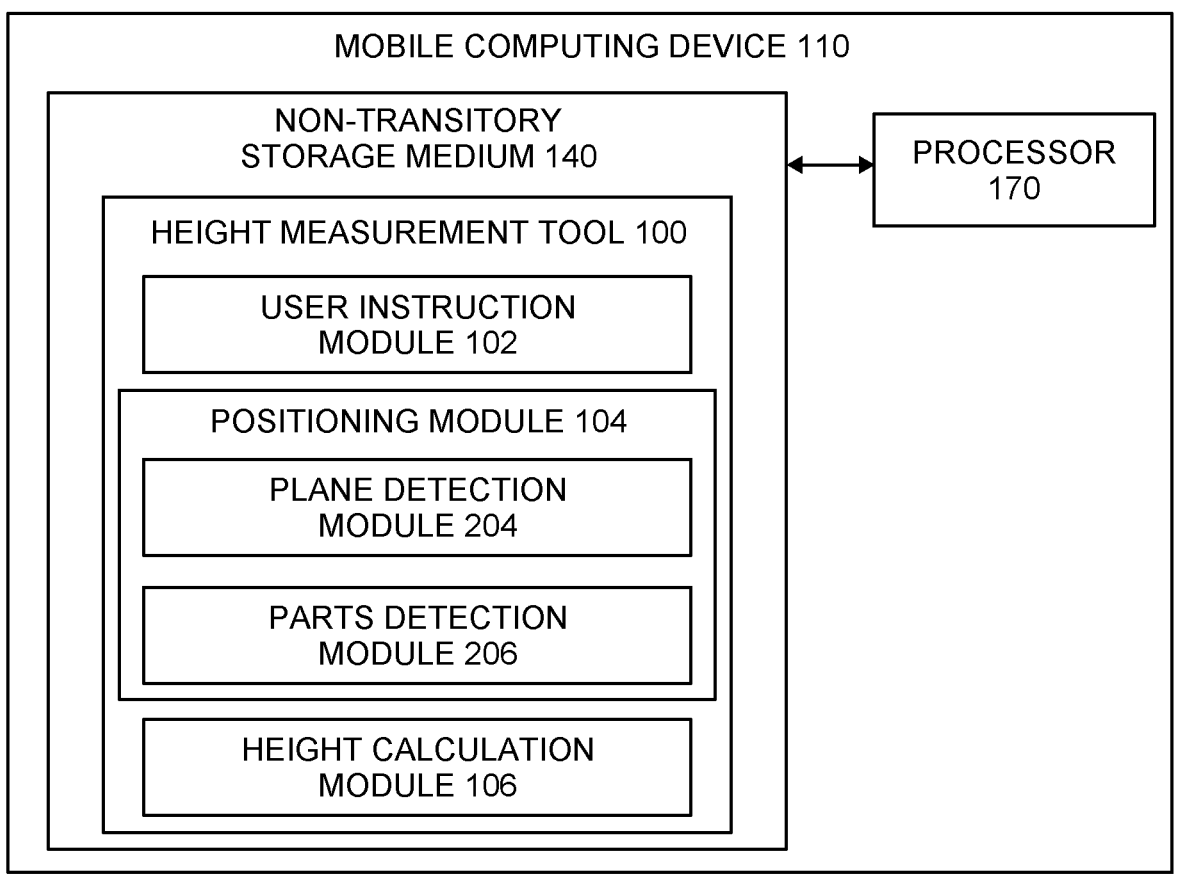
FIG. 2 shows the height measurement tool employing software development kits (SDKs) for automatically measuring the height of a 3D object in accordance with one embodiment of the invention.

FIG. 2 shows a diagram 200 of the height measurement tool 100 for automatically measuring the height of a 3D object further configured with SDKs in accordance with an embodiment of the invention. As mentioned above, the height measurement tool 100 can be implemented as modules stored on a non-transitory storage medium 140 comprising instructions executable by one or more processors 170 of a mobile computing device 110. The height measurement tool 100 includes the user instruction module 102, the positioning module 104, and the height calculation module 106. The positioning module 104 further comprises SDK-based modules including a plane detection module 204 and a parts detection module 206. The user instruction module 102 outputs instructions to users to enable the mobile computing device 110 for automatic height measurement. In an embodiment, the user instruction module 102 can provide suggestions to the user 150 not only regarding poses or positions of the user 150 but also regarding the movements and positions of the mobile computing device 110 to execute specific functions. In an example, the user instruction module 102 can be configured to generate the position guide 114 to position the user 150 in order to obtain an accurate measurement of the user's height.

The user instruction module 102 may initially instruct the user 150 to move the mobile computing device 110 so that the plane detection module 204 can detect a ground plane on which the user 150 whose height is to be measured will be positioned. The plane detection module 204 comprises the AR-SDK which is configured for plane detection. In one embodiment, the AR-SDK is the software code that enables the development of new AR applications (apps) on mobile devices. The AR-SDKs enable the primary functions of AR anchoring of the digital content into the real-world via displays of the mobile computing devices. Many AR-SDKs are available and an appropriate AR-SDK can be selected for use in the plane detection module 204 based on functionality and the devices on which the height measurement tool 100 is expected to function as detailed herein. By way of illustration and not limitation, AR-SDKs such as VUFORIA, ARKit from APPLE, ARCore from GOOGLE, etc., can be used for the plane detection module 204. For example, ARKit can run on any device with an Apple A9, A20, or A22 processor and utilizes Visual Inertial Odometry (VIO) to track the surrounding environment. VIO enables the ARKit to combine event data emitted by the hardware components on the mobile devices, such as accelerometer, gyroscope, and pedometer or other environment-related events, with camera sensor data, and provides the ability to develop applications that can detect horizontal planes (e.g., floors and tables) and vertical planes (e.g., walls). Similarly, other AR-SDKs harness the data emitted by the hardware components for plane detection in a similar fashion. While various SDKs can provide different functionalities, plane detection using ARKit will be discussed herein as an illustrative example. In the case of ARKit, when the planeDetection routine is enabled, ARKit notifies plane detection module 204 of all the surfaces that are observed in a given space by the ARKit using the camera of the mobile computing device 110. ARKit calls an add routine with an ARPlaneAnchor parameter for each unique surface to generate a plane anchor for each surface. Each plane anchor provides details about the detected surface, such as its real-world position and shape.

The parts detection module 206 employs software tools such as a CV-SDK for detecting various parts of the user 150, such as the user's eyes, ears, shoulders, etc., when the user 150 is positioned at a predefined distance from the mobile computing device 110. Again, various CV-SDKs with different functionalities are available. Some CV-SDKs, such as the FastCV Computer Vision SDK from QUAL-COMM, enable adding functionality such as gesture recognition, face detection, tracking and recognition, text recognition, and AR to camera-based apps. Fast CV offers a mobile-optimized computer vision (CV) library which includes frequently used processing functions for application across an array of mobile devices. Similarly, other CV-SDKs such as Computer Vision, which is an artificial intelligence based service from MICROSOFT enables vision capabilities. The visual data collected by cameras of mobile devices can be analyzed by the Computer Vision service for object detection and recognition, among other functions. Another open-source CV tool, the OpenCV SDK, carries machine learning (ML) models pretrained to identify not only faces, but also specific parts of the face, such as eyes, ears, etc. Further, deep learning models such as Single Shot Detectors (SSDs) and MobileNets can be used singly or in combination for detecting specific objects. MobileNets are examples of deep learning networks (DLNs) that are designed for resource-constrained devices such as smartphones. MobileNets differ from traditional convolution neural networks (CNNs) through the usage of separable convolution. MobileNets are based on the idea of depth-wise separable convolution, where the convolution is split into two states, namely a 3×3 depth-wise convolution, followed by a 1×1 pointwise convolution.

Although the design as described above reduces parameters for the deep learning network and may lead to some loss in accuracy, it is more resource-efficient. Therefore, in one embodiment, MobileNets may be used in applications such as the height measurement tool 100 which are designed to run on mobile computing devices.

Upon detecting the ground plane by the plane detection module 204, the positioning module 104 can generate the position guide 114 on a display of the mobile computing device 110. The user instruction module 102 can further instruct the user to be positioned at a predefined distance, e.g., about 2 meters, from the mobile computing device 110 in order to capture the user's image within the position guide 114. When the user 150 is correctly positioned within the position guide 114 at the predefined distance, the parts detection module 206 executes the code to detect parts, or body features, of the user 150 such as one of the eyes, ears, shoulders, etc. While a pair of eyes may be discussed below as specific examples of body features that are detected and employed for the height measurement processes, it can be appreciated that other body features, such as a pair of ears or a pair of shoulders, etc., can be similarly used by employing models trained to identify the corresponding body features. The height measurement tool 100 may, therefore, include one or more machine learning (ML) models that are trained to identify a corresponding one of the ears, eyes, or shoulders for the height estimation. Furthermore, the parts detection module 206 identifies not only the eyes of the user 150, but also the eye positions relative to each other so that the mid-point of the distance between the eyes can be obtained. In fact, many object detection models not only detect the desired objects, but also generate bounding boxes surrounding or enclosing the objects.

The height calculation module 106 receives the ground plane detection information from the plane detection module 204 and the positions of the user's eyes from the parts detection module 206. The height calculation module 106 can be configured with code to calculate the distance between the eyes and a mid-point of the distance between the user's eyes. In an embodiment, the height calculation module 106 can include code to identify the bounding boxes for the eyes and obtain the distance between such bounding boxes, and therefore the midpoint between the bounding boxes or the users' 150 eyes. The height calculation module 106 may use the midpoint between the user's eyes to calculate a first distance from the feet of the user (as obtained from the ground plane measurement) to the center of the eyes. Similarly, the height calculation module 106 can also be configured to determine a second distance of the mid-point of the distance between the eyes to the top of the head (i.e., the height of the top of the user's head). The user's total height from the user's feet to the top of the user's head may be obtained as a sum of the first distance and the second distance by the height calculation module 106.

While the measurement of the user's height in one or two steps is disclosed above, it will be appreciated that the height measurement processes need not be confined to a specific number of steps. In fact, based on the number of object detection models that are trained on the various body parts, the height measurement processes can be configured to be carried out in N number of steps. Different object detection models can be trained to identify the various body features along the length of the user's body. In an embodiment, the height calculation module 106 can include one or more object identification models trained to identify the bottom 156 of the user's feet and obtain a midpoint between the bottom of the user's feet. Similarly, one or more object detection models can be trained to identify the top of the user's head. A single distance measurement can be carried out between the midpoint of the bottom of the user feet to the top of the user's head to obtain the user's height 152.

In another example, the height measurement process can be carried out in multiple steps by training object detection models to identify different features of the user's body, determining the intermediate distances between the identified body features, and obtaining the user's height as the sum of the intermediate distances. One or more object detection models may be trained to identify different body features of the user 150, such as the user's waist, shoulders, facial features such as the ears, and height 152 may be obtained as the sum of the intermediate distances between the ground plane and the top of the user's head, which may be obtained in multiple steps.

Flowcharts for Illustrative Height Measurement Processes

Figure 3A:
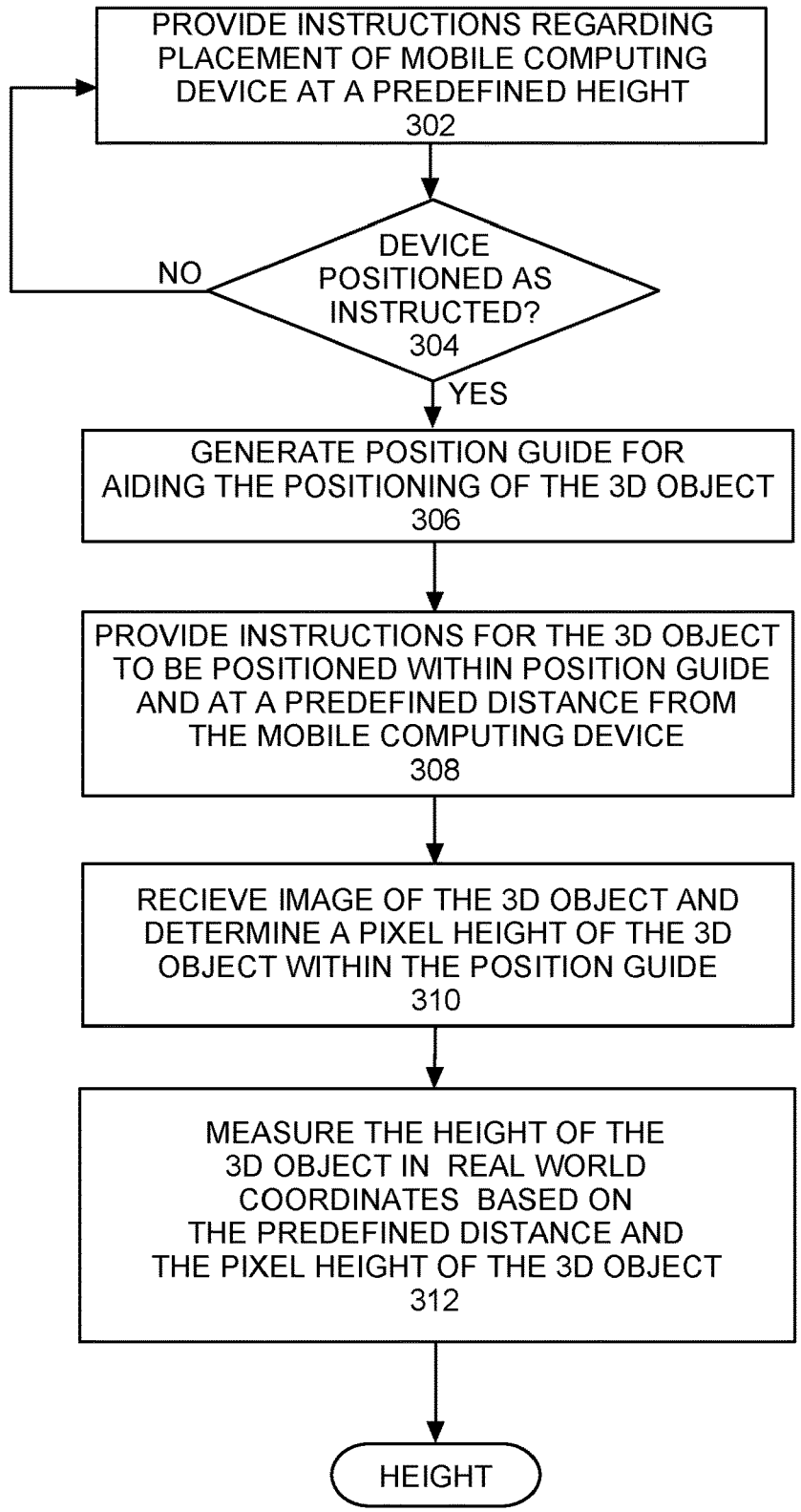
FIG. 3A shows a flowchart of an illustrative method for obtaining the height of a 3D object which may be executed by the height measurement tool in accordance with one embodiment of the invention.

FIG. 3A shows a flowchart 300 that details a method for measuring the height of a 3D object. The method may be implemented by a mobile computing device executing the height measurement tool 100. The method begins at 302 with providing instructions regarding the placement or positioning of the mobile computing device 110 with respect to a reference surface. The instructions can be provided visually and/or audibly to a user who employs the mobile computing device 110 for measuring the height of the 3D object, e.g., the user 150. At 304, it is verified if the mobile computing device is positioned accurately as instructed with respect to the reference surface 190. If it is determined at 304 that the mobile computing device is not positioned accurately with respect to the reference surface 190, the method returns to 302 with providing further instructions regarding the proper positioning of the mobile computing device 110.

If at 304, it is determined that the mobile computing device 110 is positioned accurately with respect to the reference surface 190, the method moves to 306 wherein the position guide 114 that enables accurate positioning of the 3D object for height measurement is generated. At 308, further instructions regarding positioning of the 3D object within the position guide 114 are provided to the user employing the mobile computing device 110 to measure the height of a 3D object. When the 3D object is accurately placed within the position guide 114, for example, in one embodiment of the position guide, with the top of the 3D object just touching the upper edge of the position guide 114 and the bottom of the 3D object just touching the bottom edge of the position guide 114, the pixel height of the 3D object is determined from the image 154 of the 3D object identified within the position guide 114. The actual height of the 3D object in terms of real-world coordinates may be obtained based on the predefined distance 184 and the pixel height in accordance with the procedures described herein.

Figure 3B:
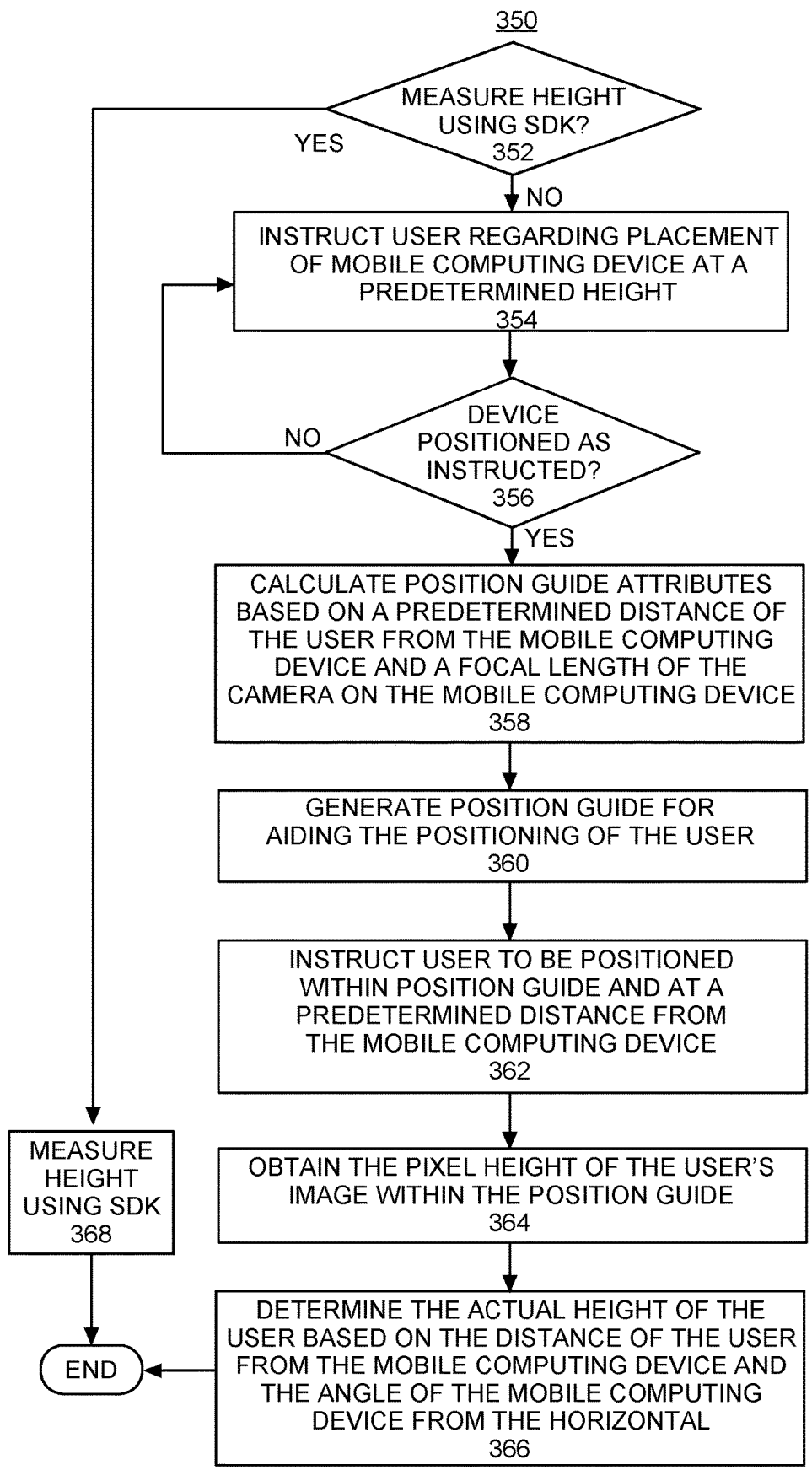
FIG. 3B shows a flowchart of another illustrative method for obtaining the height of a 3D object, such as a user, which may be executed by the height measurement tool in accordance with another embodiment of the invention.

FIG. 3B shows a flowchart 350 that details a method of estimating the height of a 3D object, such as the user 150. The method may be implemented by the mobile computing device 110. At 352, it is determined if the height is to be measured using the SDKs on the mobile computing device 110. The determination at 352 can be made based on explicit input or automatically by the software code. For example, if the appropriate SDKs are available for the make and model of the operating system running on the mobile computing device 110, then the height is measured using the available SDKs at 368. The details of the process to measure height using the SDKs are disclosed further below. If the SDKs are not available, the method moves to 354, where the user is instructed regarding the placement of the mobile computing device 110. More particularly, the user can be instructed to place the mobile computing device 110 either on the reference surface 190, such as the ground where the predefined height is zero, or at a predefined height of about 70 centimeters from the reference surface 190 on a stable horizontal surface, at a predefined angle of about 80-90 degrees to the horizontal surface. At 356, it is determined using one or more of the accelerometer data, gyroscope, or other positioning hardware data if the mobile computing device 110 is placed as instructed. If the mobile computing device 110 is not placed in accordance with the instructions, the method returns to 354 to instruct the user regarding the proper positioning of the mobile computing device 110. If it is determined at 356 that the mobile computing device 110 is positioned as instructed, the method moves to 358 wherein the position guide attributes are calculated. The attributes can include the size, the orientation, and the placement of the position guide 114 within the AR plane. In an example, the attributes of the position guide 114 can be calculated using predefined formulae based on known or measured variables such as the screen size of the mobile computing device 110, the angle of the mobile computing device 110 with the reference surface 190, the focal length of the camera on the mobile computing device 110, etc. In an example, a position guide of predefined size can be generated by instructing the user to be positioned at the predefined distance 184 and to place the mobile computing device 110 at a predefined angle as the remaining variables, such as the camera focal length are fixed. The position guide 114 is generated at 360 per the attributes calculated at 358 for aiding the positioning of the user 150. The user 150 is instructed to be positioned according to the position guide at 362 and at the predefined distance from the mobile computing device 110. The pixel height of the user's image (segment BC in the triangle ABC of FIGS. 1A and 1B) as positioned within the position guide is obtained at 364. The height of the user 150 can be determined at 366 based at least on the distance of the user 150 from the mobile computing device 110, the angle made by the mobile computing device 110 with the reference surface 190, and the pixel height of the image 154 within the position guide 114 using triangle similarities as discussed above.

Figure 3C:
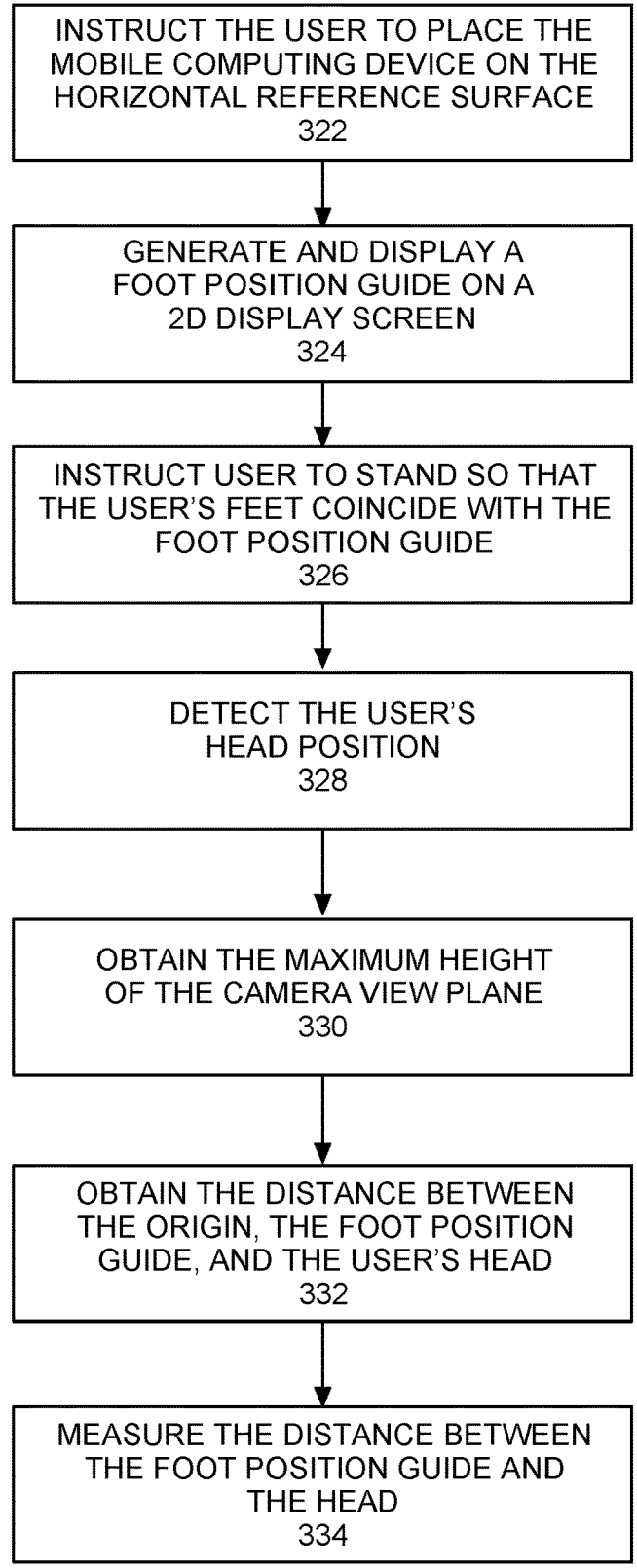
FIG. 3C shows a flowchart of yet another illustrative method for obtaining the height of a 3D object, such as a user, which may be executed by the height measurement tool in accordance with yet another embodiment of the invention.

FIG. 3C shows a flowchart 320 that details another method for measuring the height of the user 150 in accordance with another embodiment of the invention. This method corresponds to the procedure shown in FIG. 1E. At 322, the user 150 is instructed by the user instruction module 102 to place the mobile computing device 110 on the horizontal reference surface 190, e.g., the ground plane. A foot position guide 118 is generated and displayed on a 2D display screen of the mobile computing device at 324. The user 150 is then instructed at 326 to stand at a distance and at a position in front of the mobile computing device 110 in a manner that the user's feet coincide with the foot position guide 118. The user's head position D is detected at 328 using at least one of a trained deep learning network (DLN) which may be configured within the height measurement tool 100 or using object detection tools within the CV-SDK running on the mobile computing device 110. The maximum height of the camera view extending from C to A as shown in FIG. 1E is obtained at 330. In an example, the maximum height of the camera view plane can be obtained using the values from the camera matrix, which can include extrinsic and intrinsic camera parameters. With the lowest point of the camera view plane C as the origin as shown in FIG. 1E, the distances of display point B of the foot position guide 118 and the user's head D can be measured at 332. Finally, the distance between the lowest point C and the display point B can be determined at 334 as the user's height 152.

Figure 3D:
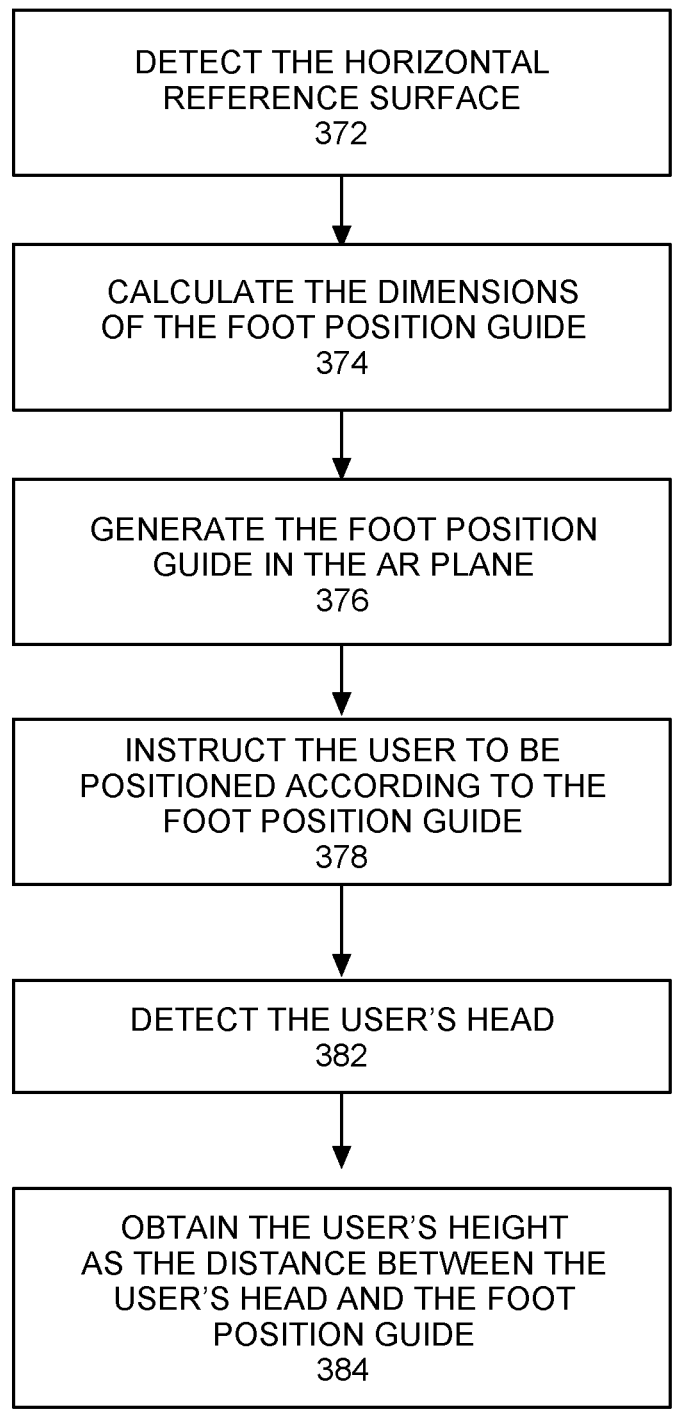
FIG. 3D shows a flowchart of yet another illustrative method for obtaining the height of a 3D object, such as a user, which may be executed by the height measurement tool in accordance with yet another embodiment of the invention using an AR-SDK running on a mobile computing device.

FIG. 3D shows a flowchart 370 that details yet another method for measuring the height of the user 150 in accordance with yet another embodiment of the invention. This method corresponds to the procedure shown in FIG. 1G. Unlike other embodiments discussed above, the method detailed in the flowchart 370 does not require positioning of the mobile computing device 110 at a predefined height or at a predefined angle, and affords more flexibility regarding the relative distances and positions of the user 150 and the mobile computing device 110. At 372, the ground plane or the horizontal reference surface 190 on which the user 150 stands is detected. At 374, the dimensions of the foot position guide 128 can be calculated based on, for example, the distance of the ground plane, the focal length of the camera on board the mobile computing device 110, etc. In an example, the dimensions of the foot position guide 128 may include the length of the foot position guide and the predefined distance at which the foot position guide 128 is generated within the AR plane. The foot position guide 128 is generated in the AR plane at the predefined distance at 376 based on the dimensions obtained at 374. The foot position guide 128 may be projected onto the ground plane or the horizontal reference surface 190 in the AR view. The user 150 may be instructed to stand on the foot position guide 128 at 378 so that the feet of the user coincide with the foot position guide 128 in the AR view. When it is detected that the user 150 is positioned as instructed, the user's head D is detected at 382 in the AR plane in accordance with the methods described above. The distance between the foot position guide 128 and the head position D in the AR target plane is determined to be the height 152 of the user 150 at 384.

Figure 4:
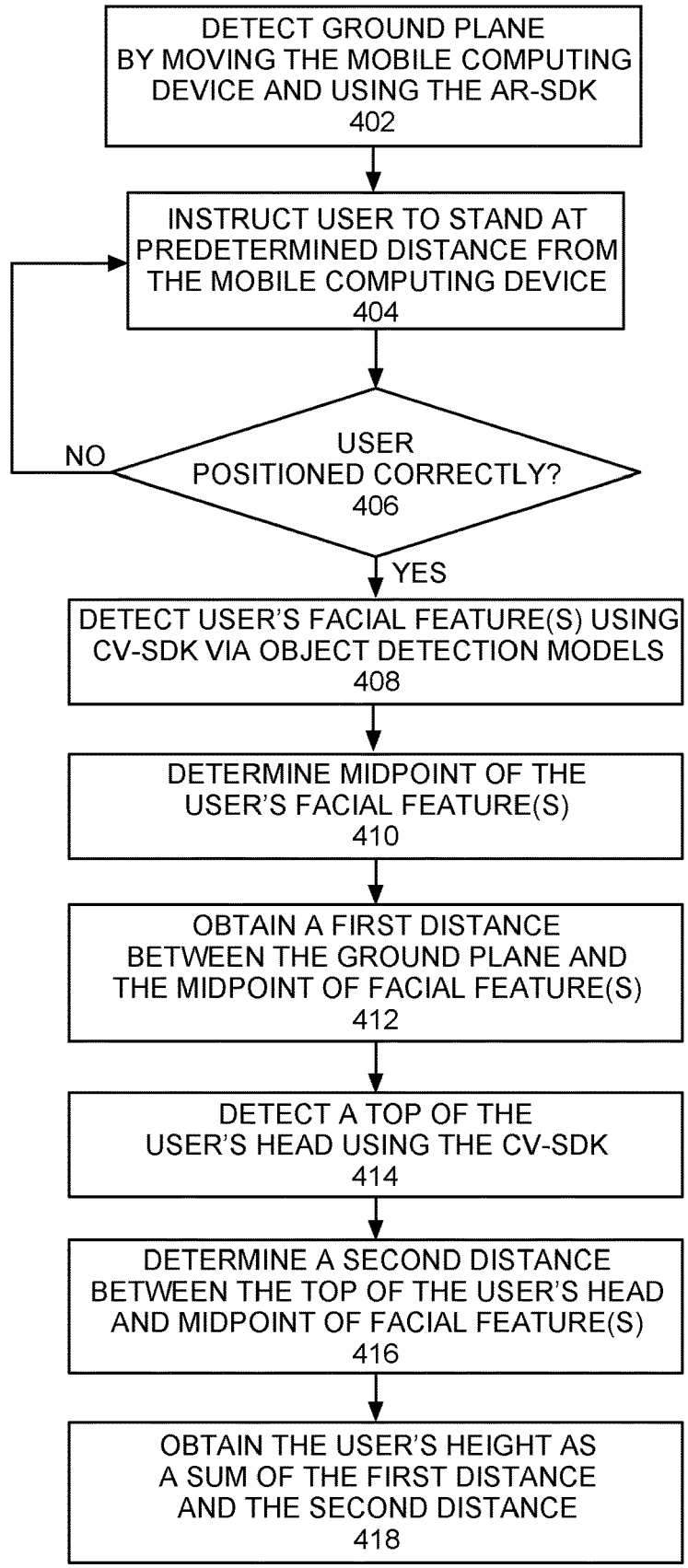
FIG. 4 shows a flowchart of yet another illustrative method of estimating the height of a 3D object, such as a user, in accordance with yet another embodiment of the invention.

FIG. 4 shows a flowchart 400 that details a method for measuring the height of a 3D object using SDKs running on the mobile computing device which may be executed by the height measurement tool 100. At 402, the reference surface 190, e.g., the ground plane, is detected by guiding the user 150 to enable the mobile computing device 110 to detect the ground plane. The height measurement tool 100 can be activated on the mobile computing device 110 to scan the surroundings in order to identify the ground plane. The ground plane can be detected using either a static detection from one or more images, or using dynamic detection by asking the user to move the mobile device to assist with detecting the ground plane. At 404, the user may be instructed to stand at a predefined distance of about 2 meters from the mobile computing device 110 via generating and displaying the position guide 114 for the predefined distance. The position guide 114 can be generated using the AR-SDK, for example, based on the angle that the mobile computing device 110 makes with the ground plane and other hardware positioning information available to the AR-SDK. At 406, the height measurement tool 100 can determine if the user is positioned within the position guide 114 at the predefined distance 184. If it is determined at 406 that the user is positioned incorrectly, the method returns back to 404 to instruct the user regarding the correct positioning. (In an example, the top 158 of the user's head can be detected directly and the distance between the ground plane (or the bottom 156 of the user's feet) and the top 158 of the user's head can be directly measured.)

If at 406, it is determined that the user is positioned correctly, the method moves to 408, where one or more of the user's body or facial feature(s), for example, the user's eyes, are detected using algorithms, such as using a CV-SDK running on the mobile computing device. The CV-SDK can enable object detection for the height measurement tool 100. Object detection can include image classification where a captured image is classified into one of the plurality of image classes, and object localization where the location of the object in an image is identified and a bounding box is drawn to encompass the object. The CV-SDK can include deep learning networks (DLNs) such as Region-Based Convolution Neural Network (R-CNN), Fast R-CNN, or Faster R-CNN that are useful for object detection and localization. Other neural network models such as You Only Look Once (YOLO), MobileNets, Single Shot Detector (SSD), and/or combinations thereof may also be trained to detect specific body or facial feature(s) of the user. Such trained models may be employed to detect the user's facial feature(s) and obtain the positions of the user's facial feature(s) relative to each other. At 410, the position of the midpoint of the user's facial feature(s) is determined. In an example, the midpoint between the user's eyes may be measured from the midpoint of the pupils. In an example, the midpoint between the facial feature(s) may also be obtained by calculating the distances between the bounding boxes of the corresponding pairs of facial feature(s). At 412, a first distance between the ground plane and the midpoint of the facial feature(s) is obtained. At 414, a top of the user's head is also detected and identified using a trained DLN, or using a trained model from the CV-SDK. At 416, a second distance between the facial feature(s) and the top of the user's head is determined. The user's height from the ground plane to the top of the user's head is measured at 418 as the sum of the first distance and the second distance.

Again, as mentioned above, determination of the midpoint of the user's facial feature(s) and the calculation of the user's height 152 in two steps is discussed for illustration purposes only. Other body or facial feature(s) may be similarly detected (for example, eyes, ears, shoulders, hips, etc.), and the user's height may be calculated in a single step or as two or more steps, based on one or more of the users' input and the configuration of the height measurement tool 100.

Hardware, Software, and Cloud Implementation of the Present Invention

As discussed, the data (e.g., photos, textual descriptions, and the like) described throughout the disclosure can include data that is stored on a database stored or hosted on a cloud computing platform. It is to be understood that although this disclosure includes a detailed description on cloud computing, below, implementation of the teachings recited herein are not limited to a cloud computing environment. Rather, embodiments of the present invention are capable of being implemented in conjunction with any other type of computing environment now known or later developed.

Cloud computing can refer to a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics may include one or more of the following. On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

In another embodiment, service models may include the one or more of the following. Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include one or more of the following. Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

The cloud computing environment may include one or more cloud computing nodes with which local computing devices used by cloud consumers, such as, for example, personal digital assistant (PDA) or cellular telephone, desktop computer, laptop computer, and/or automobile computer system can communicate. Nodes can communicate with one another. They can be group physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices are intended to be exemplary only and that computing nodes and cloud computing environment can communicate with any type of computerized device over any type of network and/or network addressable connection (e.g., using a web browser).

Figure 5:
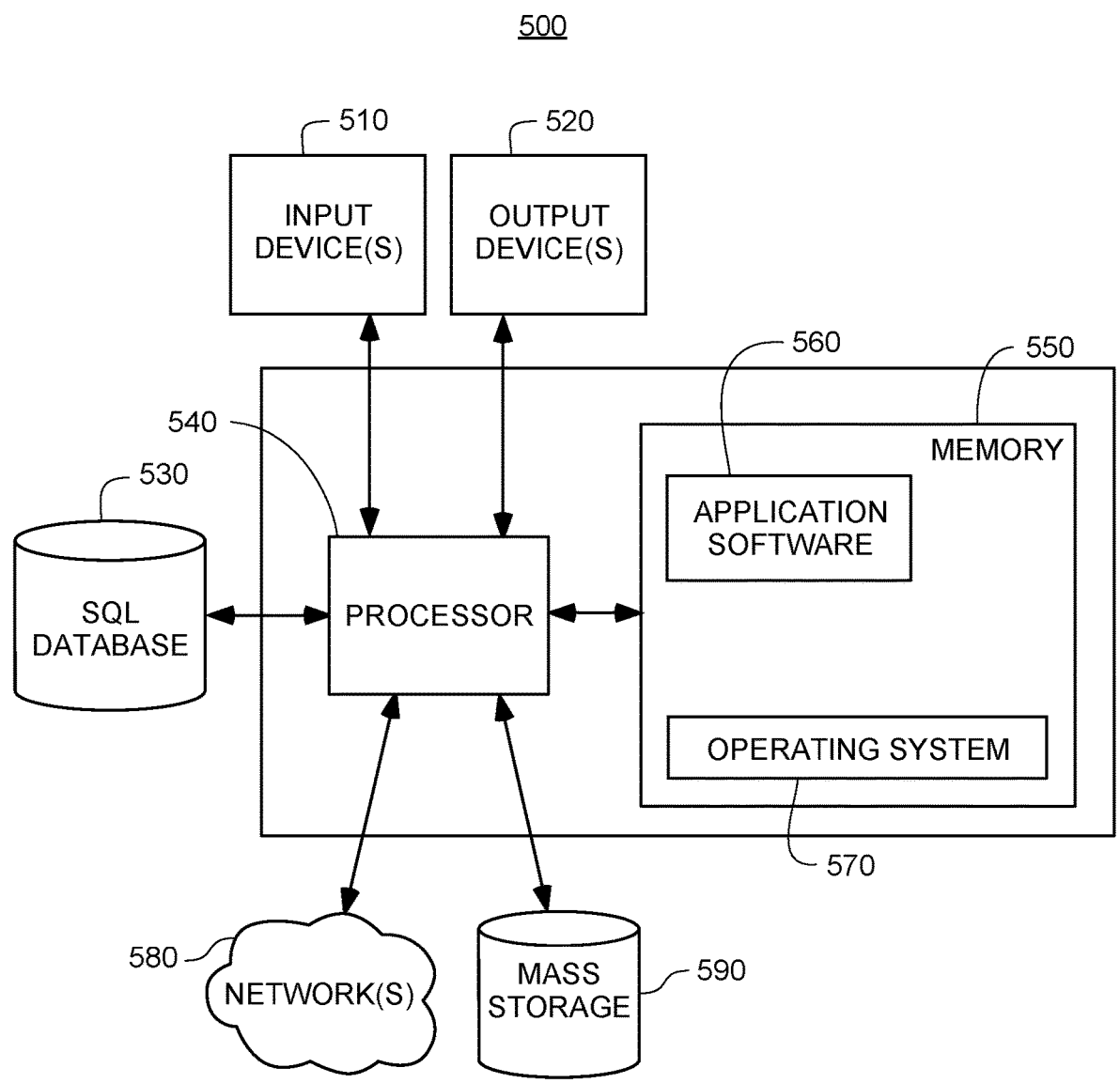
FIG. 5 shows an illustrative hardware architecture diagram of a computing device for implementing one embodiment of the present invention.

The present invention may be implemented using server-based hardware and software. FIG. 5 shows an illustrative hardware architecture diagram 500 of a server or a user-device for implementing one embodiment of the present invention. Many components of the system, for example, network interfaces etc., have not been shown, so as not to obscure the present invention. However, one of ordinary skill in the art would appreciate that the system necessarily includes these components. A computing device is hardware that includes at least one processor 540 coupled to a memory 550. The processor may represent one or more processors (e.g., microprocessors), and the memory may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a user-device also typically receives a number of inputs 510 and outputs 520 for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices 590, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware may include an interface one or more external SQL databases 530, as well as one or more networks 580 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

The hardware operates under the control of an operating system 570, and executes various computer software applications 560, components, programs, codes, libraries, objects, modules, etc. indicated collectively by reference numerals to perform the methods, processes, and 30 techniques described above.

Figure 6:
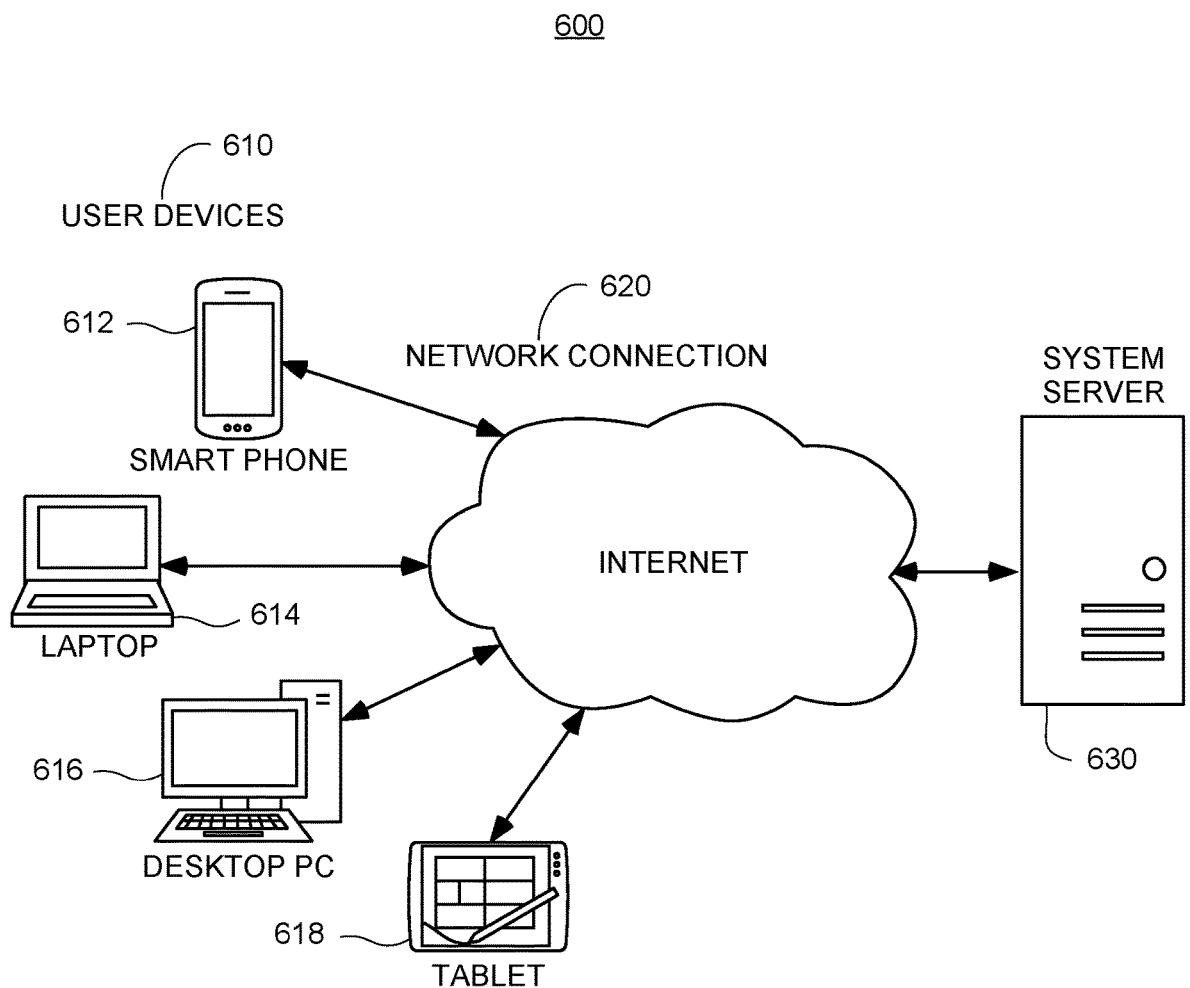
FIG. 6 shows an illustrative system architecture diagram for implementing one embodiment of the present invention in a client-server environment.

The present invention may be implemented in a client-server environment. FIG. 6 shows an illustrative system architecture 600 for implementing one embodiment of the present invention in a client server environment. User devices 610 on the client side may include smart phones 612, laptops 614, desktop PCs 616, tablets 618, or other devices. Such user devices 610 access the service of the system server 630 through some network connection 620, such as the Internet.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service) and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), and digital and analog communication media.

Example Use Cases of the Present Invention

Figure 7:
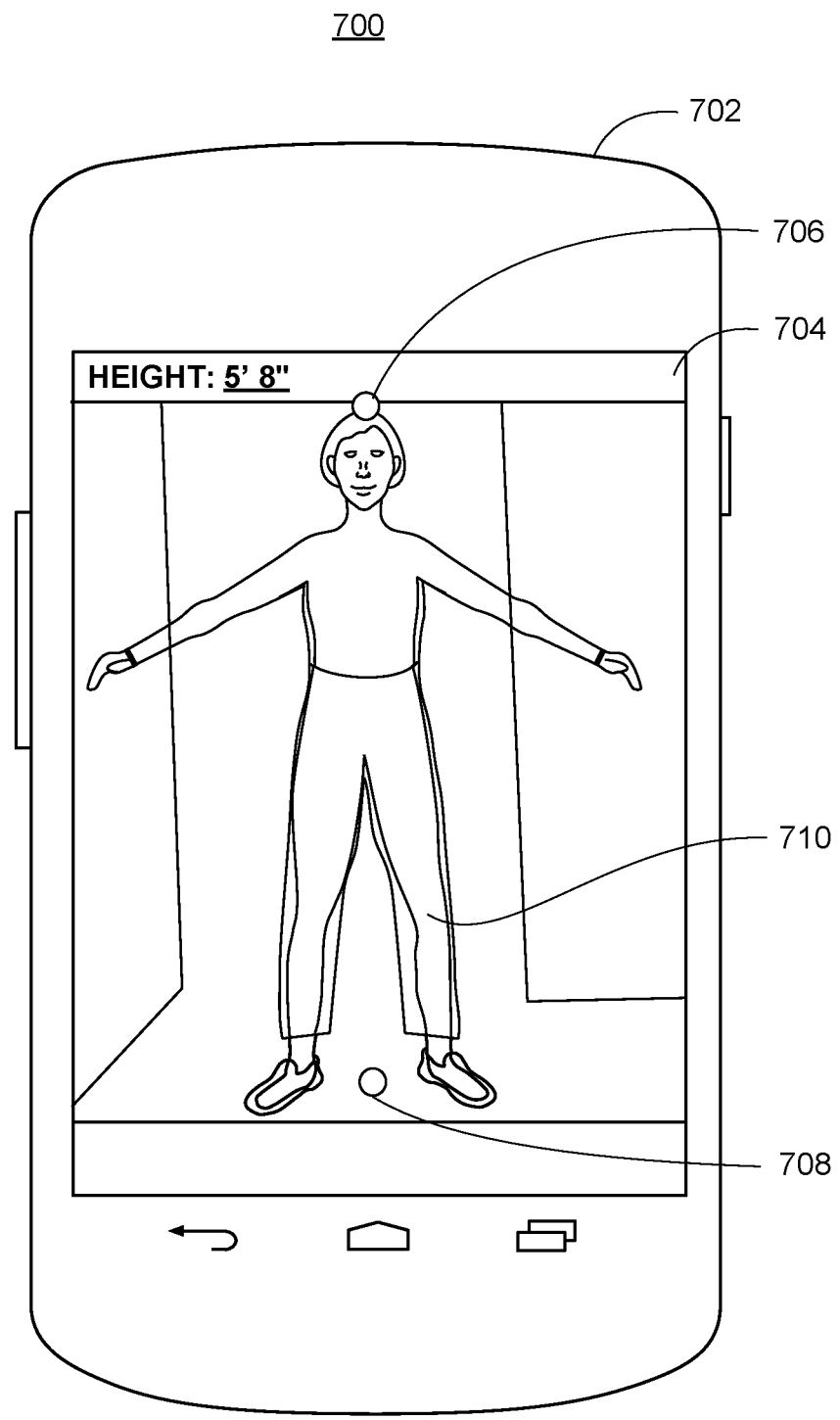
FIG. 7 shows an illustrative diagram of a use case of the present invention in which a single camera on a mobile device is used to measure the height of a clothed user standing against a normal background.

FIG. 7 shows an illustrative diagram 700 of a use case of the present invention in which a single camera on a mobile device 702 is used to measure the height of a clothed user standing against a normal background. In illustrative diagram 700, the mobile device 702 comprises a display 704, which displays a graphical user interface (GUI) showing a human figure corresponding to the user whose height is to be measured. The mobile device 702 also comprises at least one camera, a processor, a non-transitory storage medium, and a communication link to a server (not shown in FIG. 7). In one embodiment, the one or more stored or live images of the user can be transmitted to a server that may perform the operations described herein. In one embodiment, the one or more stored or live images of the user are analyzed locally by the processor of the mobile device 702. In one embodiment, the top of the user's head is identified by, for example, a first circular dot 706, and the bottom of the user's feet (or the reference surface) are identified by, for example, a second circular dot 708. The operations performed as described above return the height of the user, which may be displayed on the display 704 of the mobile device 702 as shown in FIG. 7.

In one embodiment, the height of the user may be used to provide a scale reference to measure other body features, such as the shoulder size, waist size, and so on under the clothing, as described in U.S. Pat. No. 10,321,728 referenced above. In one embodiment, the outline of human torso of the clothed user in the image is identified and displayed under the clothing as shown by line 710. In addition, in some embodiments, one or more body measurements may be presented to the user in addition to or alongside the height (not shown in the GUI of FIG. 7). In addition, the body measurements may then be utilized for many purposes, including but not limited to, offering for sale to the user one or more custom garments, custom glasses, custom gloves, custom body suits, custom PPE (personal protection equipment), custom hats, custom diet regiments, custom exercise, gym, and workout routines, and so on. Without loss of generality, the body measurements may be output, transmitted, and/or utilized for any purpose for which body measurements are useful.

The system described herein does not require the use of any specialized hardware sensors, does not require the user to stand against any special background, does not require special lighting, can be used with photos taken at any distance, and with the user wearing any type of clothing. The result is a height measurement system that works with any mobile device so that anyone can easily take photos of themselves and benefit from automatic height measurement determination.

Alternative Embodiments for Measuring Height using Augmented Reality (AR)

Some alternative embodiments of the present invention are described next. One embodiment of the present invention is a computer-implemented method for measuring a height of a 3D object, the computer-implemented method executable by a hardware processor, the method comprising providing instructions regarding positioning of a mobile computing device at a predefined height from a reference surface and at a predefined angle to the reference surface; generating a position guide in an augmented reality (AR) plane along the reference surface for display on a screen of the mobile computing device; providing instructions for positioning the 3D object within the position guide at a predefined distance from the mobile computing device; determining a pixel height of the 3D object in an image of the 3D object positioned within the position guide; and measuring the height in real-world coordinates of the 3D object based on the predefined distance and the pixel height.

In one embodiment, the generating the position guide in the augmented reality (AR) plane further comprises obtaining a focal length of a camera of the mobile device from a camera intrinsic matrix; and obtaining the predefined angle from positioning hardware onboard the mobile computing device, wherein the position guide is generated based at least on the focal length and the predefined angle.

In one embodiment, the method further comprises calculating dimensions of the position guide based on a focal length of the camera, dimensions of a screen of the mobile computing device, and/or an orientation of the mobile computing device.

In one embodiment, the predefined height is zero centimeters from the reference surface and the mobile computing device is placed on the reference surface.

In one embodiment, the predefined height is between 50 centimeters and 100 centimeters from the reference surface.

In one embodiment, the predefined angle is between 75 degrees and 90 degrees to the reference surface.

In one embodiment, the 3D object is a user, and the providing the instructions for positioning the 3D object further comprises providing instructions that the user be positioned within the position guide, wherein a top of the user's head to a tip of the user's feet are within the position guide.

In one embodiment, the determining the pixel height of the user further comprises determining a pixel distance between the user and a projected point of intersection where a ray from the user's feet meeting feet of the image intersects another ray from a top of the user's head meeting the top of a head of the image; and estimating the user's height based on the pixel height of the image of the user, the predefined distance of the user from the mobile computing device, and the pixel distance.

In one embodiment, the generating the position guide in the augmented reality (AR) plane further comprises detecting a ground plane on which the 3D object stands by employing an Augmented Reality Software Development Kit (AR-SDK) to generate the position guide, wherein the ground plane is the reference surface; and the determining the pixel height of the 3D object further comprises utilizing the ground plane on which the 3D object stands by employing the Augmented Reality Software Development Kit (AR-SDK).

In one embodiment, the determining the pixel height of the 3D object further comprises detecting a top of the 3D object using a Computer Vision Software Development Kit (CV-SDK) comprising at least one object detection model; and determining a distance between the ground plane and a top of the 3D object as the height of the 3D object.

In one embodiment, the object detection model comprises a model selected from the group consisting of a MobileNets model, a Single Shot Detector (SSD) model, and combinations thereof.

In one embodiment, the 3D object is a user, and wherein the measuring the height of the user further comprises detecting one or more facial features of the user; determining a first distance between the ground plane and one or more facial features; determining a second distance between the facial features and a top of the user's head; and computing a sum of the first distance and the second distance to determine the height of the user.

In one embodiment, the detecting the one or more facial features of the user further comprises employing an object detection model from a Computer Vision Software Development Kit (CV-SDK) for detecting the one or more facial features.

Another embodiment is a mobile computing device for measuring a height of a 3D object, comprising a camera; a processor; and a non-transitory memory storing thereon instructions executable by the processor to provide instructions regarding positioning of the mobile computing device at a predefined height from a reference surface and at a predefined angle to the reference surface; generate a position guide in an augmented reality (AR) plane along the reference surface for display on a screen of the mobile computing device; provide instructions for positioning the 3D object within the position guide at a predefined distance from the mobile computing device; determine a pixel height of the 3D object in an image of the 3D object positioned within the position guide; and measure the height in real-world coordinates of the 3D object based on the predefined distance and the pixel height.

In one embodiment, the instructions further comprise instructions to calculate dimensions of the position guide based on the predefined angle and a focal length of the camera.

In one embodiment, to provide the instructions for positioning the 3D object within the position guide, the mobile computing device comprises further instructions executable by the processor to determine if the 3D object is accurately positioned within the position guide with a top of the 3D object below an upper edge of the position guide and a bottom of the 3D object feet above a bottom edge of the position guide; and provide one or more of audible or visual instructions if the 3D object is not accurately positioned.

In one embodiment, the 3D object is a user, and wherein to measure the user's height, and the mobile computing device comprises further instructions executable by the processor to determine a pixel distance between a position of the user at the predefined distance and a projected point of intersection of two rays, wherein a first ray of the two rays starts from the user's feet and touches feet of the image and a second ray originates at a top of the user's head and touches a top of a head of the image; and measure the user's height based on the pixel height of the image of the user, the predefined distance of the user from the mobile computing device, and the pixel distance.

Yet another embodiment is a non-transitory storage medium for measuring a height of a 3D object, the storage medium comprising machine-readable instructions that cause a processor to provide instructions regarding positioning of a mobile computing device at a predefined height from a reference surface and at a predefined angle to the reference surface; generate a position guide in an augmented reality (AR) plane along the reference surface for display on a screen of the mobile computing device; provide instructions for positioning the 3D object within the position guide at a predefined distance from the mobile computing device; determine a pixel height of the 3D object in an image of the 3D object positioned within the position guide; and measure the height in real-world coordinates of the 3D object based on the predefined distance along the position guide and the pixel height.

In one embodiment, the instructions for measuring the height of the 3D object further comprise instructions that cause the processor to detect a ground plane on which the 3D object is positioned by employing an Augmented Reality Software Development Kit (AR-SDK), wherein the ground plane is the reference surface; detect one or more elements along a length of the 3D object using one or more object detection models; and determine the height of the 3D object as a sum of a first distance between the ground plane and the one or more elements of the 3D object and a second distance between the one or more elements and a top of the 3D object.

In one embodiment, the instructions for measuring the second distance further comprise instructions that cause the processor to determine the second distance between the one or more elements of the 3D object and the top of the 3D object as a sum of intermediate distances measured in multiple steps between different elements along the 3D object.

In some embodiments, the method utilizes deep learning networks, object detection models, or other computer vision algorithms to determine a left side and a right side of the 3D object in an image of the 3D object. By calculating the pixel distance between the left side and the right side of the 3D object in the image, and utilizing the predefined distance as a scale reference, the present invention can also be used to measure the width of the 3D object in a manner analogous to the method described herein for the measurement of the height. Analogously, other linear dimensions along the 2D plane, such as diagonal distances, and so forth, can also be measured on the 3D object.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every user is accommodated to practice the methods of the present invention.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A computer-implemented method for measuring a height of an object, the computer-implemented method executable by a hardware processor, the method comprising:
   receiving a first image of a reference surface on which the object is to be positioned for height measurement from a camera device on a mobile computing device;
   detecting the reference surface in the first image;
   calculating dimensions of a position guide based on a focal length and/or an orientation of the camera device on the mobile computing device;
   generating the position guide in an augmented reality (AR) plane along the reference surface on a display of the mobile computing device, wherein the position guide indicates where the object is to be positioned at a given distance on the reference surface;
   receiving a second image of the object positioned within the position guide at the given distance along the reference surface from the mobile computing device;
   determining an image height of the object in pixel coordinates;
   determining an image distance, in pixel coordinates, between a position of the object at the given distance and a projected point of intersection of two rays, wherein the two rays originate at two points of the object in the second image; and
   measuring the height of the object in real-world coordinates based on the image height, the image distance, and the given distance of the object from the mobile computing device.

2. The computer-implemented method of claim 1, wherein the object is a user, and the method further comprises:
   providing instructions that the user's feet be positioned within the position guide.

3. The computer-implemented method of claim 1, further comprising:
   providing instructions for positioning the mobile computing device at a predefined height from the reference surface and at a predefined angle to the reference surface; and
   providing instructions for positioning the object within the position guide at a predefined distance from the mobile computing device.

4. The computer-implemented method of claim 3, wherein the predefined height of the mobile computing device is zero centimeters from the reference surface and the mobile computing device is placed on the reference surface.

5. The computer-implemented method of claim 3, wherein the predefined height is between 50 centimeters and 100 centimeters from the reference surface.

6. The computer-implemented method of claim 3, wherein the predefined angle is between 75 degrees and 90 degrees to the reference surface.

7. The computer-implemented method of claim 1, wherein the detecting the reference surface on which the object is to be positioned further comprises:
   detecting the reference surface on which the object is to be positioned by employing an Augmented Reality Software Development Kit (AR-SDK) on the mobile computing device.

8. The computer-implemented method of claim 7, further comprising:

determining a pixel height of the object utilizing the reference surface on which the object is positioned by employing the Augmented Reality Software Development Kit (AR-SDK).

9. The computer-implemented method of claim 8, wherein the determining the pixel height of the object further comprises:
   detecting a top of the object using an object detection model within a Computer Vision Software Development Kit (CV-SDK) on the mobile computing device; and
   measuring a distance between the reference surface and the top of the object as the height of the object.

10. The computer-implemented method of claim 1, wherein the object is a user, and wherein the measuring the height of the user further comprises:
   detecting one or more facial features of the user;
   determining a first distance between the reference surface and the one or more facial features;
   determining a second distance between the one or more facial features and a top of the user's head; and
   computing a sum of the first distance and the second distance to measure the height of the user.

11. The computer-implemented method of claim 10, wherein the detecting the one or more facial features of the user further comprises:
   employing an object detection model from a Computer Vision Software Development Kit (CV-SDK) on the mobile device for detecting the one or more facial features.

12. The computer-implemented method of claim 1, further comprising:
   providing one or more audible or visual instructions if the object is not accurately positioned within the position guide.

13. The computer-implemented method of claim 1, further comprising:
   detecting a top portion of the object in the second image utilizing a deep learning network (DLN); and
   determining the height of the object based on a distance between the reference surface and the top portion of the object.

14. The computer-implemented method of claim 1, wherein the measuring the height of the object further comprises:
   detecting one or more portions along a length of the object using one or more object detection models; and
   determining the height of the object as a sum of a first distance between the reference surface and the one or more portions of the object and a second distance between the one or more portions and a top of the object.

15. A mobile computing device for measuring a height of an object, comprising:
   a camera device;
   a display;
   a processor; and
   a non-transitory memory storing program code thereon, the program code executable by the processor to:
      receive a first image of a reference surface on which the object is to be positioned for height measurement from the camera device on the mobile computing device;
      detect the reference surface in the first image;
      calculate dimensions of a position guide based on a focal length and/or an orientation of the camera device on the mobile computing device;
      generate the position guide in an augmented reality (AR) plane along the reference surface on the display of the mobile computing device, wherein the position guide indicates where the object is to be positioned at a given distance on the reference surface;
      receive a second image of the object positioned within the position guide at the given distance along the reference surface from the mobile computing device;
      determine an image height of the object in pixel coordinates;
      determine an image distance, in pixel coordinates, between a position of the object at the given distance and a projected point of intersection of two rays, wherein the two rays originate at two points of the object in the second image; and
      measure the height of the object in real-world coordinates based on the image height, the image distance, and the given distance of the object from the mobile computing device.

16. A non-transitory storage medium for measuring a height of an object, the storage medium comprising machine-readable program code that cause a processor to:
   receive a first image of a reference surface on which the object is to be positioned for height measurement from a camera device on a mobile computing device;
   detect the reference surface in the first image;
   calculate dimensions of a position guide based on a focal length and/or an orientation of the camera device on the mobile computing device;
   generate the position guide in an augmented reality (AR) plane along the reference surface on a display of the mobile computing device, wherein the position guide indicates where the object is to be positioned at a given distance on the reference surface;
   receive a second image of the object positioned within the position guide at the given distance along the reference surface from the mobile computing device;
   determine an image height of the object in pixel coordinates;
   determine an image distance, in pixel coordinates, between a position of the object at the given distance and a projected point of intersection of two rays, wherein the two rays originate at two points of the object in the second image; and
   measure the height of the object in real-world coordinates based on the image height, the image distance, and the given distance of the object from the mobile computing device.

17. The non-transitory storage medium of claim 16, wherein the object is a user, and the program code further cause the processor to:
   provide instructions that the user's feet be positioned within the position guide.

18. The non-transitory storage medium of claim 16, wherein the program code further cause the processor to:
   provide instructions for positioning the mobile computing device at a predefined height from the reference surface and at a predefined angle to the reference surface; and
   provide instructions for positioning the object within the position guide at a predefined distance from the mobile computing device.

19. The non-transitory storage medium of claim 16, wherein the program code further cause the processor to:
   provide one or more audible or visual instructions if the object is not accurately positioned within the position guide.

20. The non-transitory storage medium of claim 16, wherein the program code to detect the reference surface further cause the processor to:
    detect the reference surface on which the object is to be positioned by employing an Augmented Reality Software Development Kit (AR-SDK) on the mobile computing device.

\* \* \* \* \*